United States Patent [19]

Wei

[11] Patent Number: 4,520,490

[45] Date of Patent: May 28, 1985

[54] DIFFERENTIALLY NONLINEAR CONVOLUTIONAL CHANNEL CODING WITH EXPANDED SET OF SIGNALLING ALPHABETS

[75] Inventor: Lee-Fang Wei, Matawan, N.J.

[73] Assignee: AT&T Information Systems Inc., Holmdel, N.J.

[21] Appl. No.: 520,691

[22] Filed: Aug. 5, 1983

[51] Int. Cl.$^3$ .......................... H04L 1/10; H04L 5/12
[52] U.S. Cl. ...................................... 375/27; 371/43; 375/39
[58] Field of Search ....................... 375/25, 27, 39, 42; 455/60; 371/43, 44, 45; 332/9 R; 370/19, 20, 21

[56] References Cited

U.S. PATENT DOCUMENTS

| | | | |
|---|---|---|---|
| 4,077,021 | 2/1978 | Csajka et al. | 332/9 R |
| 4,084,137 | 4/1978 | Welti | 455/60 |
| 4,358,853 | 11/1982 | Qureshi | 375/39 |
| 4,483,012 | 11/1984 | Wei | 375/27 |

OTHER PUBLICATIONS

"The Viterbi Algorithm", *Proc. of IEEE*, vol. 61, No. 3, Mar. 1971, by G. D. Forney, pp. 268–278.
"Jointly Adaptive Equalization and Carrier Recovery in Two-Dimensional Digital Communication Systems", *BSTJ*, vol. 55, No. 3, Mar. 1976, by D. D. Falconer, pp. 317–334.
"Channel Coding with Multilevel/Phase Signals", *IEEE Trans. on Information Theory*, vol. IT-28, No. 1, Jan. 1982, by G. Ungerboeck, pp. 55–67.

Primary Examiner—Benedict V. Safourek
Attorney, Agent, or Firm—Barry H. Freedman

[57] ABSTRACT

A technique for converting a sequence of binary digits into a sequence of signalling alphabets of a modulated carrier signal for data transmission. By differentially encoding incoming data, non-linearly encoding the differentially encoded output in a state-dependent sequential manner and mapping the non-linearly encoded output into an expanded set of signalling alphabets having 90, 180 and 270 degree phase ambiguities, enlarged minimum Euclidean distance between possible sequences of signalling alphabets is achieved while the effect of the phase ambiguities of the expanded set of signalling alphabets can be removed in the receiver. This results in a reduced error probability when maximum likelihood decoding and differential decoding are applied in the receiver.

18 Claims, 13 Drawing Figures

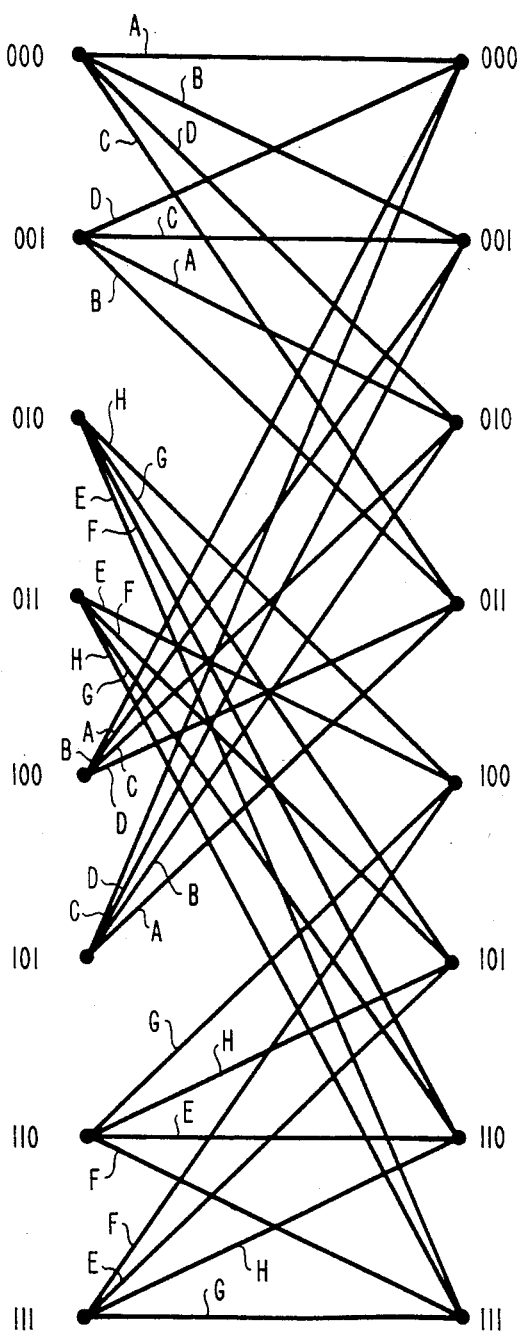

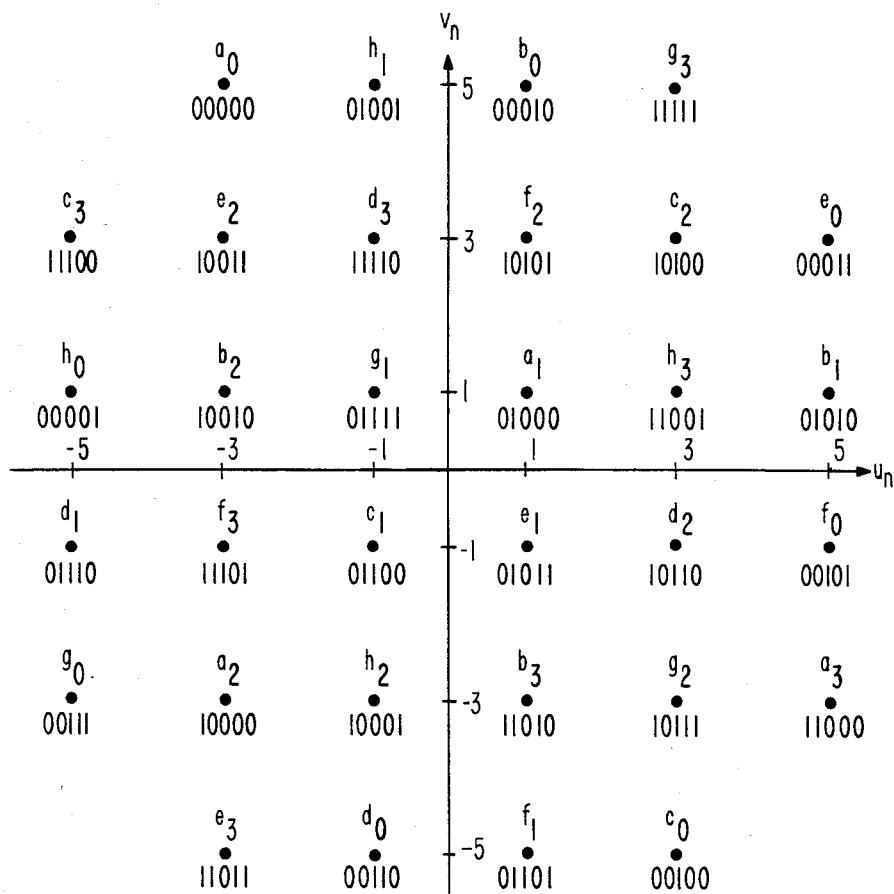

DIFFERENTIALLY NONLINEAR CONVOLUTIONAL CHANNEL CODING WITH EXPANDED SET OF SIGNALLING ALPHABETS

BACKGROUND OF THE INVENTION (a) Field of the Invention

This invention pertains generally to encoding of binary signals, and in particular, to a technique of encoding a sequence of bits for transmission on a quadrature amplitude modulated (QAM) carrier signal, in which nonlinear convolutional encoding and mapping of the encoder output to an expanded set of signalling alphabets are used to reduce the effect of channel impairments without sacrificing data rate or requiring more bandwidth, and in which differential encoding is used to remove the effect of the phase ambiguities of the expanded set of signalling alphabets.

(b) Description of the Prior Art

U.S. Pat. No. 4,077,021 issued to I. P. Csajka and G. Ungerboeck on Feb. 18, 1978, which is incorporated herein by reference, describes a technique for converting a sequence of binary digits into a sequence of signalling alphabets of a modulated carried signal for data transmission. The invention is intended to allow recovery of the original data even in situations where the transmission medium is severely impaired. Generally speaking, the Ungerboeck invention involves applying groups of r input bits to a finite state machine which is arranged to expand each input group into an $r+1$ bit group in accordance with predetermined linear logical combinations with certain bits in previous groups. The number P of bits stored in the encoder that are used to form the encoder output determine the number $m(=2^P)$ of states that the encoder may assume. Transitions from each encoder state to other states must follow prescribed rules. Accordingly, when the output of a convolutional encoder is subsequently used to modulate a carrier signal in accordance with in-phase and quadrature phase coordinates obtained by mapping the output of the convolutional encoder to an "expanded" set of $2^{r+1}$ signalling alphabets (sometimes referred to as an expanded signal constellation), the sequence of signalling alphabets must follow prescribed rules. The constellation is referred to as "expanded" because, conventionally, in order to transmit r bits in a signalling interval, a signal constellation of $2^r$ signalling alphabets would suffice. At the receiver, the effect of impairments in the transmission medium which would otherwise impede data recovery are largely overcome by a maximum-likelihood decoding algorithm which determines the correct transmitted data using knowledge of the valid sequences of signalling alphabets. A discussion of one such decoding algorithm is contained in a paper by G. D. Forney Jr. entitled "The Viterbi Algorithm", *Proc. of IEEE*, Vol. 61, No. 3, March 1973, pp. 268–278.

Despite the advantages obtained by use of the encoding technique described by Csajka and Ungerboeck, phase hits or jumps occurring in the transmission medium may result, after recovery of equalization and carrier, in a rotation of the received signalling alphabets as compared to the initial determination of phase. This ambiguity in phase can cause errors in all subsequently received data and thereby seriously degrade the performance of the system. To avoid this problem, it would be desirable to apply a differential encoding technique to the original input data so that the received signalling alphabets, even after a rotation, can be used to recover the original data. One approach to differentially convolutional channel coding was developed by the present applicant and is described in a patent application Ser. No. 486,081, entitled "Differentially Convolutional Channel Coding with Expanded Set of Signalling Alphabets", filed on Apr. 18, 1983, now U.S. Pat. No. 4,483,012 which is incorporated herein by reference. In accordance with that invention, a binary signal, which may be initially scrambled in accordance with known techniques, is applied to a differential encoder which transforms each group of r input bits into an associated group of r differentially encoded bits, which is functionally related to the values of the current r input bits and some of the previous differentially encoded bits. The r bit output of the differential encoder is then applied to a convolutional encoder which expands each group into $r+1$ bits in accordance with predetermined logical combinations with certain bits in previous differential encoded groups; the output of the convolutional encoder permits only certain sequences of $r+1$ bit groups. The $r+1$ bit group is then used to determine coordinates $u_n$ and $v_n$ which respectively determine the amplitudes of the in-phase and quadrature phase carriers. Conceptually, these coordinates are determined by mapping each $r+1$ bit group output from the convolutional encoder to a signalling alphabet in an expanded signal constellation of $2^{r+1}$ signalling alphabets using a mapping strategy which insures that (1) the minimum distance between sequences of signalling alphabets corresponding to the sequences of $r+1$ bit outputs of the convolutional encoder is maximized and (2) if the sequence of signalling alphabets at the output of the mapping device is rotated by 180 degrees (or equivalently, the coordinates $u_n$ and $v_n$ of all the mapped signalling alphabets are inverted), the original input sequence of binary digits to the differential encoder can be recovered by applying the corresponding convolutional decoding and differential decoding operations to the sequence of received rotated signalling alphabets. Alternatively, the second principle recited above may be expressed as requiring that the effect of inversion of certain bits at the input to the convolutional encoder must be the same as a 180 degree rotation of the sequence of signalling alphabets at the output of the mapping device.

Applicant's previous invention was satisfactory when the signal constellations had only 180 degree phase ambiguity. However, the invention could not be practiced with constellations which have 90, 180 and 270 degree phase ambiguities, for example, the constellations shown in FIGS. 4 and 10–13. The latter kind of signal constellations can usually better deal with various channel impairments as compared to the former kind of constellations, given that the phase ambiguities of the signal constellations are not a problem.

In view of the foregoing, it is the broad object of the present invention to provide a technique and apparatus for converting a sequence of binary digits into a sequence of signalling alphabets of a modulated carrier for transmission on a medium subject to impairments such as phase hits and phase jumps, so that the original data can be accurately recovered. Specifically, it is desired to combine the advantages obtained by encoding as taught by Csajka and Ungerboeck with those associated with differential encoding in a system in which the expanded signal constellation can have 90, 180 and 270 degree phase ambiguities.

SUMMARY OF THE INVENTION

In accordance with the present invention, a binary signal, which may be initially scrambled in accordance with known techniques, is applied to a differential encoder which transforms each group of r input bits into an associated group of differentially encoded bits, which is functionally related to the values of the current r input bits and some previous differentially encoded bits. The r bit output of the differential encoder is then applied to a non-linear convolutional encoder which expands each group into r+1 bits in accordance with predetermined non-linear logical combinations with certain bits stored in the encoder, the values of the stored bits being determined by the bits in previous differentially encoded groups; the output of the convolutional encoder permits only certain sequences of r+1 bit outputs. The r+1 bit group is then used to determine coordinates $u_n$ and $v_n$ which respectively determine the amplitudes of the in-phase and quadrature phase carriers. Conceptually, these coordinates are determined by mapping each r+1 bit group output from the convolutional encoder to a signalling alphabet in an expanded signal constellation of $2^{r+1}$ signalling alphabets which has 90, 180 and 270 degree phase ambiguities, using a mapping strategy which insures that (1) the minimum distance between sequences of signalling alphabets corresponding to the sequences of r+1 bit outputs of the convolutional encoder is maximized and (2) if the sequence of signalling alphabets at the output of the mapping device is rotated by 90, 180 or 270 degrees, the original input sequence of binary digits to the differential encoder can be recovered by applying the corresponding convolutional decoding and differential decoding operations to the sequence of received rotated signalling alphabets. Alternatively, the second principle recited above may be expressed as requiring that the effect of rotation of certain bits (explained below) at the input to the convolutional encoder must be the same as a 90, 180 or 270 degree rotation of the sequence of signalling alphabets at the output of the mapping device.

BRIEF DESCRIPTION OF THE DRAWING

The features and advantages of the present invention will be more fully appreciated by reference to the following detailed description when read in light of the accompanying drawings, in which:

FIG. 7 is a diagram illustrating the state transitions in conventional encoder 660 of FIG. 6;

FIG. 8 illustrates an expanded set of signalling alphabets which associates the outputs from convolutional encoder 660 of FIG. 6 with coordinates used to modulate the in-phase and quadrature phase components of a carrier signal;

DETAILED DESCRIPTION

Figure 1:
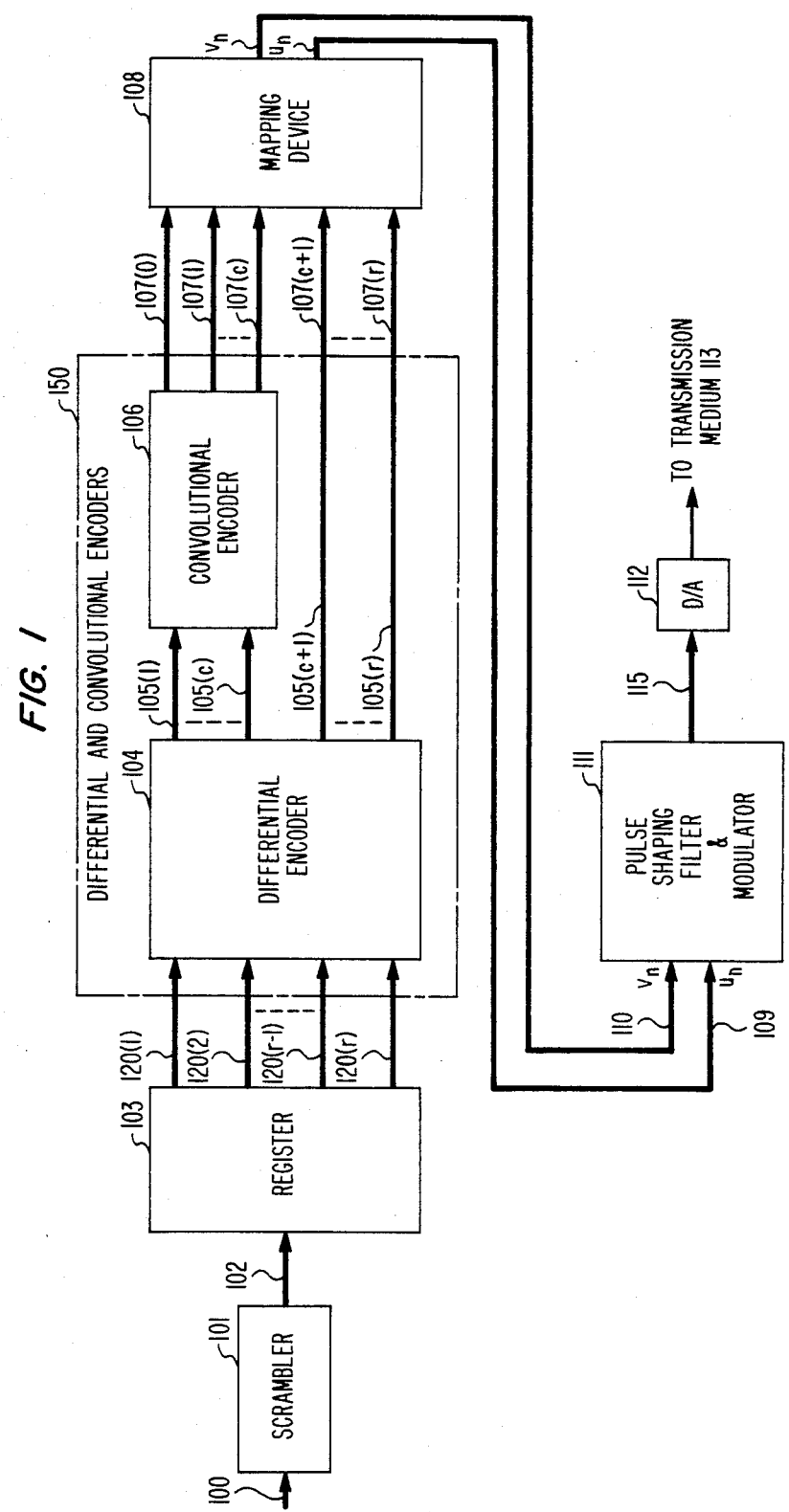
FIG. 1 is an overall block diagram of a transmitter arranged in accordance with the principles of the present invention.

Referring first to FIG. 1, there is shown in block diagram form a transmitter structure arranged in accordance with the present invention to modulate a carrier signal in accordance with a sequence of binary digits. An input bit sequence on line 100, typically consisting of a series of 1's and 0's or a series of 1's and −1's, may optionally be applied to a conventional scrambler 101 which is arranged to provide an output bit sequence on line 102 representing the original data. The scrambler output is grouped in r-bit groups, for example by a serial in/parallel out register 103. Each r bit group on lines 120(1) through 120(r) is then applied during successive signalling intervals to a differential encoder 104, which is arranged to differentially encode at least two of the r input bits, and to provide r output bits on lines 105(1) through 105(r). Differential encoding is accomplished by logically combining the selected ones of the current input bits with some of the previous output bits from encoder 104.

As shown in FIG. 1, C of the differentially encoded bits output from encoder 104 on lines 105(1) through 105(C), respectively, are applied to a non-linear convolutional encoder 106, examples of which are described below, which is arranged to expand each C-bit group at its input into a corresponding C+1 bit group in accordance with the values of the applied inputs and the bits stored in the encoder, the values of the stored bits being determined by previous inputs. Typically, C is an integer at least one but less than r, but in some circumstances, all of the outputs of encoder 104 may be applied to encoder 106. Subsequently, the r+1 bits consisting of the C+1 bits output from convolutional encoder 106 on lines 107(0) through 107(C), together with inputs on lines 107(C+1) through 107(r) which are taken from the remaining r-C bits output from differential encoder 104 on lines 105(C+1) through 105(r) are used to determine coordinates $u_n$ and $v_n$ on lines 109 and 110 which respectively determine the amplitudes of in-phase and quadrature phase carriers which are combined for application to an analog transmission medium 113. Determination of the values of $u_n$ and $v_n$ is performed by mapping device 108, described in more detail below, which associates each possible combination of the r+1 input bits with a particular signalling alphabet in an expanded signal constellation of $2^{r+1}$ signalling alphabets, which has 90, 180 and 270 degree phase ambiguities. The precise association of each possible combination of the r+1 bits with an alphabet is performed in accordance with specified rules which allow the original data to be recovered in the receivier (1) with a significant coding gain, and (2) without losses due to phase ambiguities of the expanded signal constellation. Gain occurs because the minimum distance among the allowable sequences of signalling alphabets is enlarged, thus providing more margin before channel impairments destroy the ability of the receiver to recover the original data. The effect of phase ambiguities of the expanded signal constellation is removed by use of differential encoding in conjunction with a specified strategy for mapping the non-linear convolutional encoder output to the signalling alphabet.

The sequence of coordinates $u_n$ and $v_n$ are thereafter processed conventionally in pulse-shaping filter and modulator 111, which generates a digital output on line 115 which is converted to analog form in D/A converter 112 before being applied to analog transmission medium 113.

Figure 2:
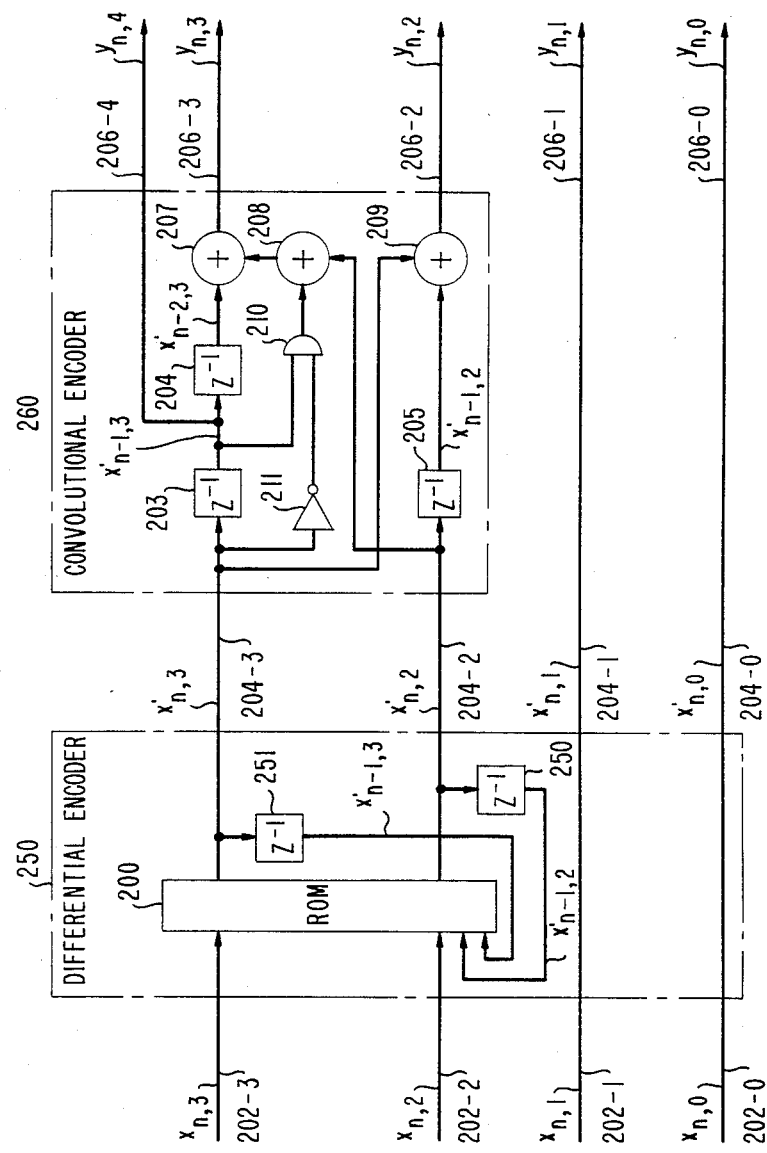
FIG. 2 is a detailed logic diagram of one embodiment of differential encoder 104 and convolutional encoder 106 of FIG. 1.

FIG. 2 illustrates a specific example of logic elements that can be used to first differentially encode and then non-linearly convolutionally encode a binary sequence when r is 4 and C is 2. The logic of FIG. 2 thus performs the operations associated with encoders 104 and 106 within block 150 of FIG. 1. A further example of logic elements used to implement encoder 106 in a feedback form is described below. In FIG. 2, the r outputs of register 103 of FIG. 1 which are applied as inputs to differential encoder 250, have been renumbered, such that output 120(1) corresponds to input 202-3, output 120(2) corresponds to input 202-2, output 120(3) corresponds to input 202-1 and output 120(r) corresponds to input 202-0. The bits appearing on lines 202-0 through 202-3 are designated $x_{n,0}$, $x_{n,1}$, $x_{n,2}$ and $x_{n,3}$, respectively, where the subscript n is an index used to indicate bits in the r bit group arrived in the current signalling interval, bits arrived in the previous signalling interval having subscript n−1, and bits arrived in the yet previous signalling interval having subscript n−2. The differentially encoded outputs on lines 204-3 through 204-0 are designated $x'_{n,3}$, $x'_{n,2}$, $x'_{n,1}$ and $x'_{n,0}$, respectively, the prime indicating differentiation. Differential encoder 250 is arranged such that two input bits $x_{n,2}$ and $x_{n,3}$ on lines 202-2 and 202-3, respectively, are differentially encoded by applying these two bits and the previous differentially encoded outputs $x'_{n-1,2}$ and $x'_{n-1,3}$ which are stored in one signalling interval delay elements 250 and 251 to a read-only memory (ROM) 200 which provides the input to output translation depicted in the following Table 1:

TABLE 1

| Previous Output $x'_{n-1,2}\ x'_{n-1,3}$ | Current Input $x_{n,2}\ x_{n,3}$ | Current Output $x'_{n,2}\ x'_{n,3}$ |
| --- | --- | --- |
| 00 | 00 | 00 |
| 01 | 00 | 01 |
| 10 | 00 | 10 |
| 11 | 00 | 11 |
| 00 | 01 | 01 |
| 01 | 01 | 10 |
| 10 | 01 | 11 |
| 11 | 01 | 00 |
| 00 | 10 | 10 |
| 01 | 10 | 11 |
| 10 | 10 | 00 |
| 11 | 10 | 01 |
| 00 | 11 | 11 |
| 01 | 11 | 00 |
| 10 | 11 | 01 |
| 11 | 11 | 10 |

For example, if the differential encoder input pair $x_{n,2}\ x_{n,3}$ is 01 and the previous differential encoder output pair $x'_{n-1,2}\ x'_{n-1,3}$ is 11, the current differential encoder output pair $x'_{n,2}\ x'_{n,3}$ is 00. This type of differential encoding is well known by itself (see, for example, FIG. 7 in application Ser. No. 486,080, entitled "Differential Encoding Technique" filed by J. Mazo on Apr. 18, 1983, and assigned to Bell Telephone Laboratories, Incorporated). One way of accomplishing the particular type of differential encoding illustrated in Table 1 is by modulo-4 (i.e., $100_{base2}$) binary addition of the previous differential encoder output pair $x'_{n-1,2}\ x'_{n-1,3}$ to the current differential encoder input pair $x_{n,2}\ x_{n,3}$. The two remaining input bits $x_{n,0}$ and $x_{n,1}$ applied on lines 202-0 and 202-1 are not differentially encoded but are nevertheless designated outputs $x'_{n,0}$ and $x'_{n,1}$ on lines 204-0 and 204-1, respectively, for consistency.

The differential encoding performed by encoder 250 can be viewed as a "rotation" of the previous differential encoder output pair $x'_{n-1,2}\ x'_{n-1,3}$, in accordance with the value of the current different encoder input pair $x_{n,2}\ x_{n,3}$. To appreciate the meaning of "rotation", consider that the previous differential encoder output pair $x'_{n-1,2}\ x'_{n-1,3}$ can have any of four values 00, 01, 10 and 11 arranged in a four element sequence, 00, 01, 10, 11. (Note that the four values may be arranged in a total of 4! different sequences.)

An element in this sequence can be rotated by 0, 1, 2 or 3 positions. For example, the second element 01 is rotated by 0 positions when its value is not changed. This element is rotated by one position when its value becomes 10, the value of the next element in the sequence. The element is rotated by 2 positions when its value becomes 11, the value of the element 2 positions ahead in the sequence. This element is rotated by 3 positions when its value becomes 00; this value is 3 positions ahead of 01 when the 4 element sequence is treated as a circular sequence. A similar procedure is used to rotate the other elements in the sequence by 0, 1, 2 or 3 positions. Each of the four possible values 00, 01, 10 and 11 of the current differential encoder input pair $x_{n,2}\ x_{n,3}$ is assigned a specific position differential which is used to determine the current differential encoder output pair $x'_{n,2}\ x'_{n,3}$ such that this output pair is the particular bit pair in the four element sequence that is 0, 1, 2 or 3 positions advanced from the previous differential encoder output pair $x'_{n-1,2}\ x'_{n-1,3}$. In our specific example, differential encoder 250 is arranged such that the current differential encoder input pair 01 corresponds to a 1 position differential, the pair 10 corresponds to a 2 position differential, 11 corresponds to a 3 position differential, and 00 corresponds to no rotation. (Here again, assignment of position differentials to differential encoder input pair $x_{n,2}\ x_{n,3}$ may be made in any of 4! different ways.)

Once having selected a particular four-element sequence and a particular correspondence between differential encoder input pairs and position differentials, the input/output characteristic of encoder 250 becomes fixed. For any given previous output $x'_{n-1,2}\ x'_{n-1,3}$ and current input $x_{n,2}\ x_{n,3}$, the differential encoder output $x'_{n,2}\ x'_{n,3}$ is determined by advancing the previous output the appropriate number of positions. In the example given here, a current input 01 causes an output 11 when the previous output is 10, because 11 is one position ahead of 10 in the four element sequence. A current input of 10 for the same previous output results in an output of 00, representing the pair in the sequence given above that is 2 positions advanced from the previous output 10.

A differential decoder arranged to reverse the differential encoding process recovers the original pair of bits $x_{n,2} x_{n,3}$ input to the differential encoder from the values of the previous and current pairs of differentially encoded output bits $x'_{n-1,2} x'_{n-1,3}$ and $x'_{n,2} x'_{n,3}$. The input/output characteristic for the decoder corresponding to differential encoder 250 is indicated in Table 2 below:

TABLE 2

| Previous Input $x'_{n-1,2} x'_{n-1,3}$ | Current Input $x'_{n,2} x'_{n,3}$ | Current Output $x_{n,2} x_{n,3}$ |
| --- | --- | --- |
| 00 | 00 | 00 |
| 01 | 01 | 00 |
| 10 | 10 | 00 |
| 11 | 11 | 00 |
| 00 | 01 | 01 |
| 01 | 10 | 01 |
| 10 | 11 | 01 |
| 11 | 00 | 01 |
| 00 | 10 | 10 |
| 01 | 11 | 10 |
| 10 | 00 | 10 |
| 11 | 01 | 10 |
| 00 | 11 | 11 |
| 01 | 00 | 11 |
| 10 | 01 | 11 |
| 11 | 10 | 11 |

One way of accomplishing the particular type of differential decoding illustrated in Table 2 is by modulo-4 (i.e., $100_{base2}$) binary subtraction of the previous differential decoder input pair $x'_{n-1,2} x'_{n-1,3}$ from the current differential encoder input pair $x'_{n,2} x'_{n,3}$.

The differential decoder reverses the process performed in the encoder by determining the *difference* in positions between each pair of the current input bit pair $x'_{n,2} x'_{n,3}$ and the previous input bit pair $x'_{n-1,2} x'_{n-1,3}$, given knowledge of the particular four element sequence used in the differential encoder. Based on this difference and knowledge of the encoder position differential assignment, the original bit pair $x_{n,2} x_{n,3}$ can be derived. In our specific example, a 00 input at the encoder corresponds to no rotation, hence detection of two identical input bit pairs results in a decoder output of 00. A 01 input at the encoder corresponds to a one position rotation, hence detection of present and previous input bit pairs that differ by one position produce an output of 01.

Because differential encoding of each input bit pair as described above is accomplished by "rotating" the previous output by a specific position differential, a desirable property of such encoding and decoding is its immunity to a rotation of all of the elements in the encoder output. Despite such a rotation, the original data sequence may be recovered. This property results from the fact that the decoder examines the differences between successive input bit pairs: this difference does not change if all of the pairs are rotated by the same amount. For example, if an input bit sequence {01, 11, 10, 11} is applied to encoder 250, its output is {01, 00, 10, 01}, assuming a previous output of 00. If this output sequence is rotated by one position, it becomes {01, 10, 01, 11, 10}. Application of this sequence to the decoder yields the original sequence.

Returning to the description of the embodiment of FIG. 2 in which the value of C is selected as 2, two outputs $x'_{n,2}$ and $x'_{n,3}$ from differential encoder 250 on lines 204-2 and 204-3 are applied to a non-linear convolutional encoder 260 which expands the two differentially encoded bits into three output bits $y_{n,2}$, $y_{n,3}$ and $y_{n,4}$ on lines 206-2 through 206-4, respectively, in accordance with the values of preselected previous inputs from encoder 250 on lines 204-2 and 204-3. The remaining outputs $x'_{n,0}$ and $x'_{n,1}$ from differential encoder 250 on lines 204-0 and 204-1 extended to the input to mapping device 108 of FIG. 1 without any processing. These bits appear on lines 206-0 and 206-1 and are redesignated as bits $y_{n,0}$ and $y_{n,1}$, respectively, for consistency.

As seen in FIG. 2, non-linear convolutional encoder 260 includes three delay elements 203, 204 and 205, each of which is arranged to delay its input by one signalling interval, three exclusive OR gates 207, 208 and 209, and other logic elements including inverter 211 and AND gate 210 which together make the operation of encoder 260 non-linear. By way of comparison, convolutional encoder 660 in applicant's previous patent application Ser. No. 486,081 uses only delay elements and exclusive OR gates, and hence the operation is linear. This distinction will be discussed further below.

In FIG. 2, output $y_{n,4}$ of encoder 260 on line 206-4 is obtained by delaying $x'_{n,3}$ by one signalling interval in delay element 203. Accordingly:

$$y_{n,4} = x'_{n-1,3}$$

The output $y_{n,2}$ of encoder 260 on line 206-2 is obtained by delaying $x'_{n,2}$ by one signalling interval and logically exclusively OR'ing the output with $x'_{n,3}$. Accordingly, $$y_{n,2} = x'_{n-1,2} \oplus x'_{n,3}$$

where the symbol $\oplus$ represents the exclusive OR function.

Output $y_{n,3}$ from encoder 260 is mathematically represented as $$y_{n,3} = (x'_{n,3} x'_{n-1,3}) \oplus x'_{n,2} \oplus x'_{n-2,3},$$

where the quantity in parenthesis is obtained by logically AND'ing $x'_{n,3}$ and $\overline{x'_{n-1,3}}$, where the bar above the quantity $x'_{n,3}$ indicates inversion.

Figure 3:
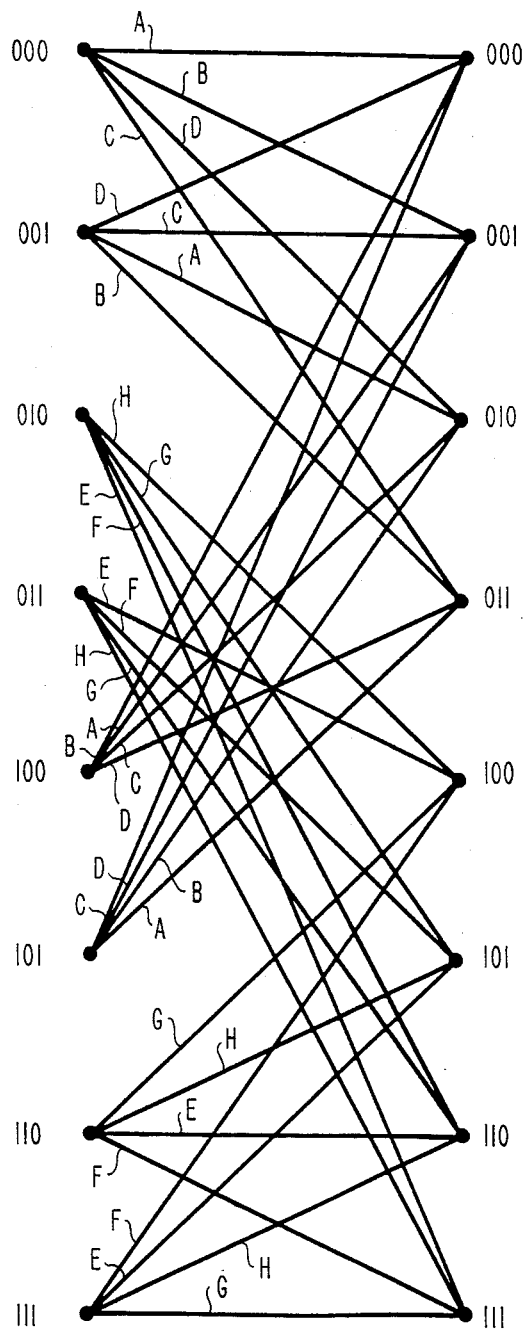
FIG. 3 is a diagram illustrating the state transitions allowed in convolutional encoder 260 of FIG. 2.

The operation of convolutional encoder 260 of FIG. 2 will be better appreciated by reference to the state transition diagram shown in FIG. 3. As seen in FIG. 2, encoder 260 uses three previous input bits $x'_{n-2,3}$, $x'_{n-1,3}$ and $x'_{n-1,2}$, the first two being received on line 204-3 and delayed in delay elements 203 and 204 by two and one signalling intervals, respectively, and the last being received on line 204-2 and delayed by one signalling interval, to form its current outputs. Since the three stored bits can be combined in eight different combinations, encoder 260 is referred to as an eight state encoder. The eight states are designated 000, 001, 010, 011, 100, 101, 110 and 111, where the three bit state designation corresponds to the values of $x'_{n-2,3}$, $x'_{n-1,3}$ and $x'_{n-1,2}$, respectively. Because of the particular arrangement of delay elements 203, 204 and 205, allowed transitions from each of the eight "current" states shown on the left-hand portion of FIG. 3 to the eight "next" states on the right-hand portion of FIG. 3 are limited. For each current state, transitions to only four next states are allowed; the allowed next states are determined by the four possible combinations of the values of $x'_{n,3}$ and $x'_{n,2}$ as well as the stored value of $x'_{n-1,3}$. More specifically, for current state 000, $x'_{n-1,3}=0$, and transitions are permitted only to next states 000, 001, 010 and 011 for $x'_{n,3}x'_{n,2}=00$, 01, 10 and 11, respectively. Transitions from current state 001 are permitted only to next states 000, 001, 010 and 010 while transitions from states 010, 011, 100, 101, 110 and 111 are similarly limited to the four allowable next states shown in FIG. 3. The meaning of the letters A, B, C, D, E, F, G and H associated with state transitions of FIG. 3 will be explained later.

The significance of non-linear convolutional encoding can also be appreciated by understanding the relationship of the input and output bits applied to and generated by convolutional encoder 260 of FIG. 2, as illustrated in Table 3 below:

TABLE 3

| Current State $x'_{n-2,3}\,x'_{n-1,3}$ $x'_{n-1,2}$ | Input $x'_{n,3}\,x'_{n,2}$ | Next State $x'_{n-1,3}\,x'_{n,3}\,x'_{n,2}$ | Output $y_{n,2}\,y_{n,3}\,y_{n,4}$ |
|---|---|---|---|
| 000 | 00 | 000 | 000 |
| 000 | 01 | 001 | 010 |
| 000 | 10 | 010 | 100 |
| 000 | 11 | 011 | 110 |
| 001 | 00 | 000 | 100 |
| 001 | 01 | 001 | 110 |
| 001 | 10 | 010 | 000 |
| 001 | 11 | 011 | 010 |
| 010 | 00 | 100 | 011 |
| 010 | 01 | 101 | 001 |
| 010 | 10 | 110 | 101 |
| 010 | 11 | 111 | 111 |
| 011 | 00 | 100 | 111 |
| 011 | 01 | 101 | 101 |
| 011 | 10 | 110 | 001 |
| 011 | 11 | 111 | 011 |
| 100 | 00 | 000 | 010 |
| 100 | 01 | 001 | 000 |
| 100 | 10 | 010 | 110 |
| 100 | 11 | 011 | 100 |
| 101 | 00 | 000 | 110 |
| 101 | 01 | 001 | 100 |
| 101 | 10 | 010 | 010 |
| 101 | 11 | 011 | 000 |
| 110 | 00 | 100 | 001 |
| 110 | 01 | 101 | 011 |
| 110 | 10 | 110 | 111 |
| 110 | 11 | 111 | 101 |
| 111 | 00 | 100 | 101 |
| 111 | 01 | 101 | 111 |
| 111 | 10 | 110 | 011 |
| 111 | 11 | 111 | 001 |

As shown in Table 3, for each of the eight possible current states (000, 001, 010, 011, 100, 101, 110, 111), the outputs $y_{n,2}$, $y_{n,3}$ and $y_{n,4}$ of convolutional encoder 260 can assume only four out of eight possible sets of values. For example, if the current state is 000, then $y_{n,2}$, $y_{n,3}$, $y_{n,4}$ can be only 000, 010, 100 or 110 (but not 001, 011, 101 or 111) depending on the value of the current inputs bits $x'_{n,3}$, $x'_{n,2}$ on lines 204-3 and 204-2, respectively. Since the next state which can follow any current state is limited to four out of eight possible states, only certain sequences of groups of bits $y_{n,2}$, $y_{n,3}$, $y_{n,4}$ are allowed at the output of conventional encoder 260. By combining the three coded bits $y_{n,2}$, $y_{n,3}$ and $y_{n,4}$ output from convolutional encoder 260 on lines 206-2, 206-3 and 206-4, respectively, with the two bits $y_{n,0}$ and $y_{n,1}$ on lines 206-0 and 206-1, respectively, the previous statement also says that only certain sequences of groups of bits $y_{n,0}$, $y_{n,1}$, $y_{n,2}$, $y_{n,3}$, and $y_{n,4}$ on lines 206-0 through 206-4, respectively, are allowed by convolutional encoder 260.

Convolutional encoder 260 is intentionally made non-linear in order to assure that the second principal mentioned above with respect to the mapping device in the summary of the invention can be satisfied. Proof that the encoder is non-linear can be observed by exclusively OR'ing, bit by bit, some pairs of sets of values of the five input bits $x'_{n-2,3}$, $x'_{n-1,3}$, $x'_{n-1,2}$, $x'_{n,3}$ and $x'_{n,2}$, and the associated sets of the values of the three output bits $y_{n,2}$, $y_{n,3}$ and $y_{n,4}$, using Table 3. If the result of this process does not correspond to an entry (line) in Table 3, then the convolutional encoder is non-linear.

For example, when the sets of values of $x'_{n-2,3}$, $x'_{n-1,3}$, $x'_{n-1,2}$, $x'_{n,3}$ and $x'_{n,2}$ are {0, 0, 1, 1, 1} and {0, 1, 0, 0, 0}, the associated sets of values of the three output bits $y_{n,2}$, $y_{n,3}$ and $y_{n,4}$ are {0, 1, 0} and {0, 1, 1}, respectively. If the five bit sets are exclusively OR'ed, bit by bit, the result is {0, 1, 1, 1, 1}; This set of values is associated, in Table 3, with outputs {0, 1, 1}. However, when the sets of bits {0, 1, 0} and {0, 1, 1} are exclusively OR'ed, bit by bit, the result is {0, 0, 1}. Accordingly, this arrangement of convolutional encoder 260 is non-linear. This is to be contrasted with the convolutional encoders 260 and 660 shown in applicant's previous application Ser. No. 486,081 cited above. In those encoders, the foregoing bit-by-bit exclusive-OR'ing of any two selected sets of values of the input bits produces another set of values of the input bits associated with the set of values of the output bits which is the *same* as the result formed by exclusive-OR'ing of the sets of values of the output bits associated with the selected sets of values of the input bits.

The requirement for non-linear convolutional encoding, recognized by applicant as essential for accomplishing the objects of the present invention is thought to stem from the fact that the differential encoding process described above is also non-linear. If is theorized that non-linear differential encoding must be coupled with non-linear convolutional encoding in order to enable satisfactory results; no instance of linear convolutional encoding has been found which satisfies the objects of the present invention.

As stated previously, the group of five bits $y_{n,0}$, $y_{n,1}$, $y_{n,2}$, $y_{n,3}$ and $y_{n,4}$ on lines 206-0 through 206-4, respectively, is used to determine the values of coordinates $u_n$ and $v_n$ which are subsequently used to modulate a QAM carrier. Conceptually, these coordinates are determined by mapping each group of five bits to a signalling alphabet in an expanded set of $2^5=32$ signalling alphabets, such that the horizontal and vertical positions of the signalling alphabet represent $u_n$ and $v_n$, respectively. Again, the set of signalling alphabets is referred to as "expanded" because, conventionally, in order to transmit 4 bits in a signalling interval, a set of $2^4=16$ signalling alphabets would suffice.

Figure 4:
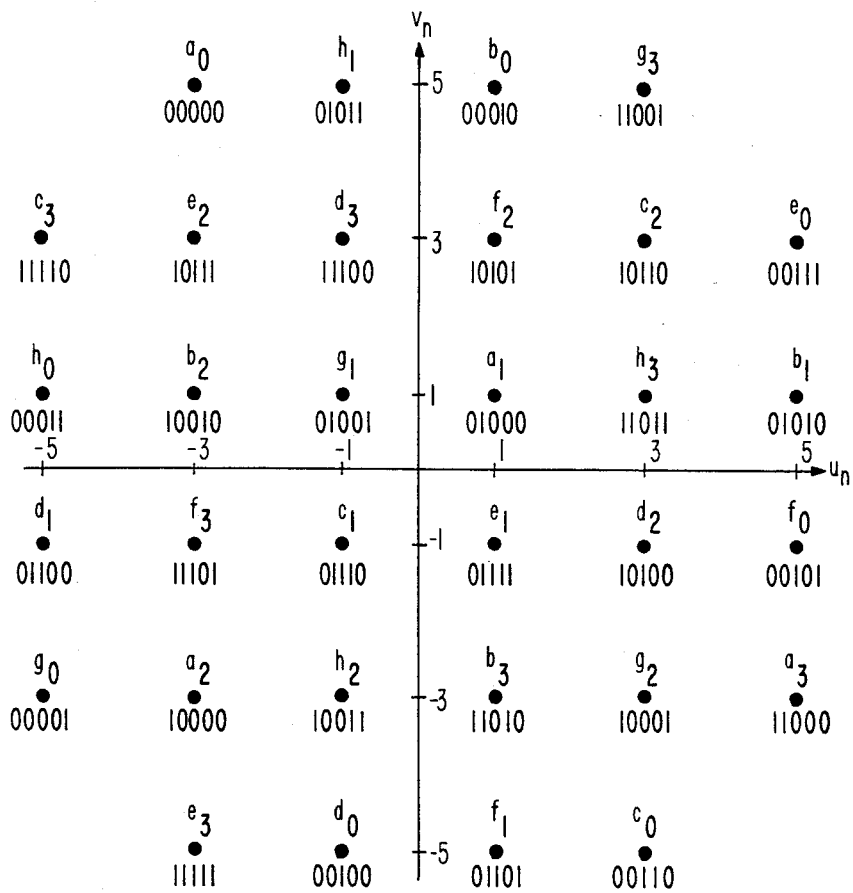
FIG. 4 illustrates an expanded set of signalling alphabets which associates the outputs from convolutional encoder 260 of FIG. 2 with the coordinates used to modulate the in-phase and quadrature phase components of a carrier signal.

The expanded signal constellation illustrated in FIG. 4, commonly referred to as 32-CROSS, includes a total of 32 points, called signalling alphabets, arranged in a series of six rows and columns. The first and last rows and columns each include 4 alphabets, while the remaining rows and columns each include 6 alphabets. Designations $a_0$-$a_3$, $b_0$-$b_3$, $c_0$-$c_3$, $d_0$-$d_3$, $e_0$-$e_3$, $f_0$-$f_3$, $g_0$-$g_3$ and $h_0$-$h_3$. uniquely identify each alphabet. The vertical position of each alphabet is used to determine the coordinate $v_n$ while the horizontal position determines the coordinate $u_n$. Both $u_n$ and $v_n$ can be negative or positive, and the expanded signal constellation illustrated in FIG. 4 includes normalized possible coordinates of ±1, ±3 and ±5 for both $u_n$ and $v_n$.

As will be explained in more detail below, one necessary attribute of the expanded signal constellation of FIG. 4 is its 90, 180 and 270 degree phase ambiguities. This means that if the expanded signal constellation is rotated by 90, 180 and 270 degrees, the locations of the rotated signalling alphabets will correspond to the locations of the unrotated (original) signalling alphabets. For example, signalling alphabet $d_3$ (having coordinates $(-1,3)$) when rotated by 90, 180 and 270 degrees, would be respectively located at coordinates $(3,1)$, $(1,-3)$ and $(-3,-1)$, the locations of the original signalling alphabets $h_3$, $b_3$ and $f_3$, respectively. Likewise, signalling alphabet $e_0$ at coordinates $(5,3)$, when rotated by 90, 180 and 270 degrees, corresponds to the locations of the original signalling alphabets $c_0$, $g_0$ and $a_0$, respectively. On the other hand, ambiguity of any amount of degrees other than K times 90 degrees (where K is any integer) is absent from the expanded signal constellation of FIG. 4; if the expanded signal constellation is rotated by any amount of degrees other than K times 90 degrees, the locations of the rotated signalling alphabets will not match the locations of the original signalling alphabets. This is unlike the constellation shown in applicant's application Ser. No. 486,081 where only 180 degree ambiguity is allowed.

In accordance with the present invention, the association between the group of bits $y_{n,0}$, $y_{n,1}$, $y_{n,2}$, $y_{n,3}$ and $y_{n,4}$ on lines 206-0 through 206-4, respectively, and the expanded set of signalling alphabets of FIG. 4 must follow certain rules (described below) in order to achieve the coding gain associated with convolutional encoding and yet provide resolution at the receiver of phase ambiguities of the expanded signal constellation being used. The particular association shown in FIG. 4 can be used in conjunction with differential encoder 250 and convolutional encoder 260 shown in FIG. 2, but alternative are also possible.

In FIG. 4, the 5-bit code appearing beneath each alphabet indicates the values of the five bits $y_{n,0}$, $y_{n,1}$, $y_{n,2}$, $y_{n,3}$, and $y_{n,4}$ on lines 206-0 through 206-4, respectively. Thus, for example, when $y_{n,0}$, $y_{n,1}$, $y_{n,2}$, $y_{n,3}$ and $y_{n,4}$ are equal to 1, 0, 1, 0 and 1, respectively, the associated signalling alphabet is $f_2$ whose coordinates $u_n$ and $v_n$ are equal to 1 and 3 respectively.

The manner in which the group of five bits $y_{n,0}$, $y_{n,1}$, $y_{n,2}$, $y_{n,3}$ and $y_{n,4}$ is assigned to a signalling alphabet in FIG. 4 must first assure that coding gain is preserved. This accomplished by using the principles set forth in the Ungerboeck's patent cited above which are set forth in more detail below. Because the present invention advantageously uses differential encoding to enable data recovery in spite of 90, 180 or 270 degree rotation of the expanded signal constellation being used, additional requirements are imposed. In particular, the mapping must be such that first, in the simplest case, any four signalling alphabets which lie on the same radius but 90 degrees apart must be associated with the same set of values of the bits $y_{n,0}$ and $y_{n,1}$ which are not processed by the convolutional encoder. In our specific example, for example, signalling alphabets $a_o$, $e_o$, $c_o$ and $g_o$ lie on the same radius but 90 degrees apart, and the sets of values of $y_{n,0}$ and $y_{n,1}$ associated with them are all equal to $\{0,0\}$. Second, if elements in the two bit sequence $\ldots x'_{n-1,2} \, x'_{n-1,3}, \, x'_{n,2} \, x'_{n,3}, \, x'_{n+1,2} \, x'_{n+1,3} \ldots$ applied to convolutional encoder 260 are all rotated by the same one, two or three positions, which is defined above with respect to the differential encoder, the effect must be the same as a 90, 180 or 270 degree rotation of the signalling alphabets produced at the output of the mapping device. The correspondence between one, two and three position rotations of the two bit sequence and 90, 180 and 270 degree rotations of the signal constellation must be one-to-one. However, a two position rotation of the two bit sequence must correspond to a 180 degree rotation of the signal constellation. Again, in our specific example, one, two and three position rotations of the two bit sequence correspond to 90, 180 and 270 degree rotations of the signal constellation, respectively. If the condition stated above is satisfied, then when the received sequences of signalling alphabets are rotated by 90, 180 or 270 degrees relative to the transmitted sequence of signalling alphabets, the effect on the output of the corresponding convolutional decoder in the receiver would be rotation of all the elements corresponding to the elements in the two bit sequence $\ldots x'_{n-1,2} \, x'_{n-1,3}, \, x'_{n,2} \, x'_{n,3}, \, x'_{n+1,2} \, x'_{n+1,3} \ldots$ applied to convolutional encoder 260 in the transmitter by the same one, two or three positions. The remaining two bits corresponding to $x'_{n,0}$ and $x'_{n,1}$ at the output of the differential encoder in the transmitter will not be changed. Accordingly, the output of the corresponding convolutional decoder, when subsequently differentially decoded, will yield the input binary sequence in its original form prior to differential encoding.

Verification that the mapping of the groups of bits $y_{n,0}$, $y_{n,1}$, $y_{n,2}$, $y_{n,3}$ and $y_{n,4}$ to the expanded signal constellation shown in FIG. 4 satisfies the requirement of the rule stated above can be illustrated by first referring to Table 4, which illustrates the outputs (col. 2) produced by convolutional encoder 260 for all possible combinations of input bits $x'_{n-2,3}$, $x'_{n-1,2}$, $x'_{n-1,3}$ $x'_{n,2}$ and $x'_{n,3}$ in col. 1.

TABLE 4

| Input Bits To Convolutional Encoder 260 $x'_{n-2,3} \, x'_{n-1,2} \, x'_{n-1,3} \, x'_{n,2} \, x'_{n,3}$ | Encoder Output Corresponding To Inputs in Col. 1 $y_{n,2} \, y_{n,3} \, y_{n,4}$ | One Position Rotated Input Bits To Convolutional Encoder 260 $x'_{n-2,3} \, x'_{n-1,2} \, x'_{n-1,3} \, x'_{n,2} \, x'_{n,3}$ | Encoder Output Corresponding To Inputs in Col. 3 $y_{n,2} \, y_{n,3} \, y_{n,4}$ |
|---|---|---|---|
| 0 0 0 0 0 | 0 0 0 | 1 0 1 0 1 | 1 1 1 |
| 0 0 0 0 1 | 1 0 0 | 1 0 1 1 0 | 0 1 1 |
| 0 0 0 1 0 | 0 1 0 | 1 0 1 1 1 | 1 0 1 |
| 0 0 0 1 1 | 1 1 0 | 1 0 1 0 0 | 0 0 1 |
| 0 0 1 0 0 | 0 1 1 | 1 1 0 0 1 | 0 1 0 |
| 0 0 1 0 1 | 1 0 1 | 1 1 0 1 0 | 1 0 0 |
| 0 0 1 1 0 | 0 0 1 | 1 1 0 1 1 | 0 0 0 |
| 0 0 1 1 1 | 1 1 1 | 1 1 0 0 0 | 1 1 0 |
| 0 1 0 0 0 | 1 0 0 | 1 1 1 0 1 | 0 1 1 |
| 0 1 0 0 1 | 0 0 0 | 1 1 1 1 0 | 1 1 1 |
| 0 1 0 1 0 | 1 1 0 | 1 1 1 1 1 | 0 0 1 |
| 0 1 0 1 1 | 0 1 0 | 1 1 1 0 0 | 1 0 1 |
| 0 1 1 0 0 | 1 1 1 | 1 0 0 0 1 | 1 1 0 |
| 0 1 1 0 1 | 0 0 1 | 1 0 0 1 0 | 0 0 0 |
| 0 1 1 1 0 | 1 0 1 | 1 0 0 1 1 | 1 0 0 |

TABLE 4-continued

| Input Bits To Convolutional Encoder 260 $x'_{n-2,3}\ x'_{n-1,2}\ x'_{n-1,3}\ x'_{n,2}\ x'_{n,3}$ | Encoder Output Corresponding To Inputs in Col. 1 $y_{n,2}\ y_{n,3}\ y_{n,4}$ | One Position Rotated Input Bits To Convolutional Encoder 260 $x'_{n-2,3}\ x'_{n-1,2}\ x'_{n-1,3}\ x'_{n,2}\ x'_{n,3}$ | Encoder Output Corresponding To Inputs in Col. 3 $y_{n,2}\ y_{n,3}\ y_{n,4}$ |
|---|---|---|---|
| 0 1 1 1 1 | 0 1 1 | 1 0 0 0 0 | 0 1 0 |
| 1 0 0 0 0 | 0 1 0 | 0 0 1 0 1 | 1 0 1 |
| 1 0 0 0 1 | 1 1 0 | 0 0 1 1 0 | 0 0 1 |
| 1 0 0 1 0 | 0 0 0 | 0 0 1 1 1 | 1 1 1 |
| 1 0 0 1 1 | 1 0 0 | 0 0 1 0 0 | 0 1 1 |
| 1 0 1 0 0 | 0 0 1 | 0 1 0 0 1 | 0 0 0 |
| 1 0 1 0 1 | 1 1 1 | 0 1 0 1 0 | 1 1 0 |
| 1 0 1 1 0 | 0 1 1 | 0 1 0 1 1 | 0 1 0 |
| 1 0 1 1 1 | 1 0 1 | 0 1 0 0 0 | 1 0 0 |
| 1 1 0 0 0 | 1 1 0 | 0 1 1 0 1 | 0 0 1 |
| 1 1 0 0 1 | 0 1 0 | 0 1 1 1 0 | 1 0 1 |
| 1 1 0 1 0 | 1 0 0 | 0 1 1 1 1 | 0 1 1 |
| 1 1 0 1 1 | 0 0 0 | 0 1 1 0 0 | 1 1 1 |
| 1 1 1 0 0 | 1 0 1 | 0 0 0 0 1 | 1 0 0 |
| 1 1 1 0 1 | 0 1 1 | 0 0 0 1 0 | 0 1 0 |
| 1 1 1 1 0 | 1 1 1 | 0 0 0 1 1 | 1 1 0 |
| 1 1 1 1 1 | 0 0 1 | 0 0 0 0 0 | 0 0 0 |

If the input pairs of bits $x'_{n-2,2}\ x'_{n-2,3}$, $x'_{n-1,2}\ x'_{n-1,3}$ and $x'_{n,2}\ x'_{n,3}$ are all rotated by one position, as shown in col. 3 of Table 4, the outputs of convolutional encoder 260 are shown in col. 4.

Inspection of FIG. 4 and Table 4 reveals that the associated signalling alphabets are rotated by 90 degrees when the input pairs of bits $x'_{n-2,2}\ x'_{n-2,3}$, $x'_{n-1,2}\ x'_{n-1,3}$ and $x'_{n,2}\ x'_{n,3}$ of convolutional encoder 260 are all rotated by one position. For example, when the bits $x'_{n,0}, x'_{n,1}, x'_{n,2}, x'_{n,3}, x'_{n-1,2}, x'_{n-1,3}$ and $x'_{n-2,3}$, which are the bits used to derive the current group of bits $y_{n,0}, y_{n,1}, y_{n,2}, y_{n,3}$ and $y_{n,4}$ at the input to the mapping device, are equal to 1, 0, 1, 0, 1, 1 and 1, respectively, the bits $y_{n,0}, y_{n,1}, y_{n,2}, y_{n,3}$ and $y_{n,4}$ are equal to 1,0,1,1 and 1, respectively, and the mapped signalling alphabet is $e_2$. Now, when the bits $x'_{n,2}$, $x'_{n,3}$, $x'_{n-1,2}, x'_{n-1,3}$ and $x'_{n-2,3}$ input to convolutional encoder 260 are rotated by one position, the bits $x'_{n,2}$, $x'_{n,3}$, $x'_{n-1,2}$, $x'_{n-1,3}$ and $x'_{n-2,3}$ become 1, 1, 0, 0 and 0, respectively, and the bits $y_{n,0}, y_{n,1}, y_{n,2}, y_{n,3}$ and $y_{n,4}$ become 1, 0, 1, 1 and 0, respectively, and the mapped signalling alphabet becomes $c_2$, which is the alphabet obtained when alphabet $e_2$ is rotated by 90 degrees. Similarly, it can be shown that the associated signalling alphabets are rotated by 180 and 270 degrees when the input pairs of bits $x'_{n-2,2}\ x'_{n-2,3}$, $x'_{n-1,2}\ x'_{n-1,3}$ and $x'_{n,2}\ x'_{n,3}$ of convolutional encoder 260 are all rotated by two and three positions, respectively.

Figure 5:
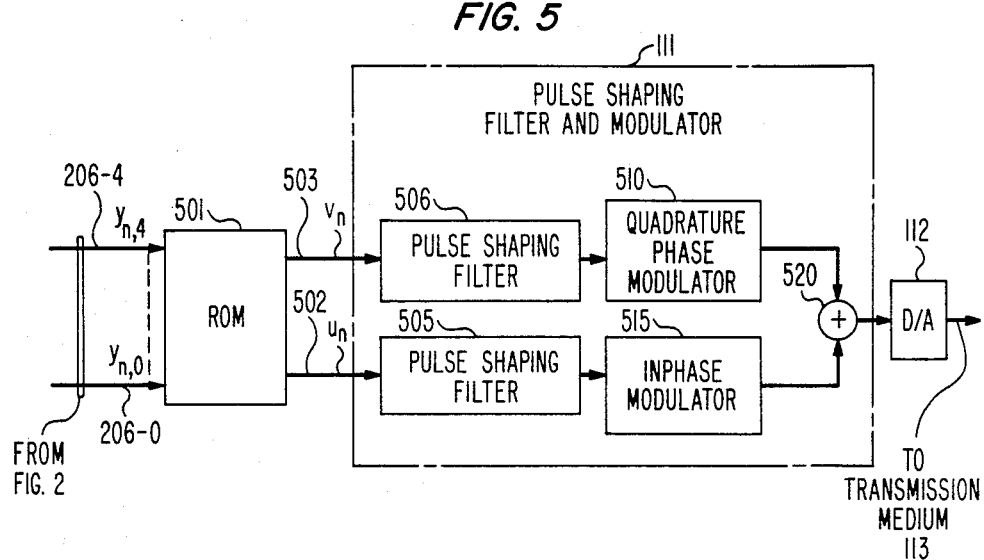
FIG. 5 is a block diagram of apparatus for mapping the outputs of the convolutional encoder to associated coordinates used to modulate in-phase and quadrature phase components of a QAM modulated carrier signal.

As shown in FIG. 5, which illustrates the apparatus used to implement the remainder of the transmitter of FIG. 1, the mapping between the groups of bits $y_{n,0}$ through $y_{n,4}$ and the coordinates $u_n$ and $v_n$ of the signalling alphabets in the constellation of FIG. 4, can be simply accomplished in a read only memory (ROM) 501 which provides two output values $u_n$ and $v_n$ on lines 502 and 503, respectively, for each five bit input on lines 206-0 through 206-4. These coordinate values are then processed conventionally before transmission over analog medium 113. Generally, such processing includes pulse shaping of $u_n$ and $v_n$ in filters 505 and 506, subsequent modulation in modulators 515 and 510 of respective in-phase and quadrature phase carriers by the filter outputs, combination of the two modulated outputs in adder 520 and digital to analog conversion in converter 112 before application to transmission medium 113. Details of the filtering and modulating operations just described are well known to those skilled in the art, and are available in many references such as a paper by D. D. Falconer entitled "Jointly Adaptive Equalization and Carrier Recovery in Two Dimensional Digital Communication Systems", *Bell System Technical Journal*, March 1976.

In the description of FIG. 2, convolutional encoder 260 was considered as receiving a two bit input and providing an associated three bit output. Notationally, it would be more convenient to consider the convolutional encoder as having four input bits and five output bits, even though two of the bits are not processed in the convolutional encoder. Accordingly, in the following description, this method of notation is used.

Before proceeding with a description of a second embodiment of the present invention, it is important to note that in the eight state code shown in FIGS. 2–4, each state transition of the convolutional encoder corresponds to four possible combinations of bits $y_{n,0}$–$y_{n,4}$ at the output of the convolutional encoder, due to the two input bits $x'_{n,0}$ and $x'_{n,1}$ which are not processed by the convolutional encoder. Therefore, there are four signalling alphabets corresponding to each state transition. These four signalling alphabets form one of the eight sets, i.e., sets A, B, C, D, E, F, G and H of signalling alphabets, which are defined such that $A=\{a_i\}$, $B=\{b_i\}$, $C=\{c_i\}$, $D=\{d_i\}$, $E=\{e_i\}$, $F=\{f_i\}$, $G=\{g_i\}$ and $H=\{h_i\}$ for i=0, 1, 2, 3. This association of sets of signalling alphabets with state transitions of convolutional encoder 260 is clearly indicated in FIG. 3.

Figure 6:
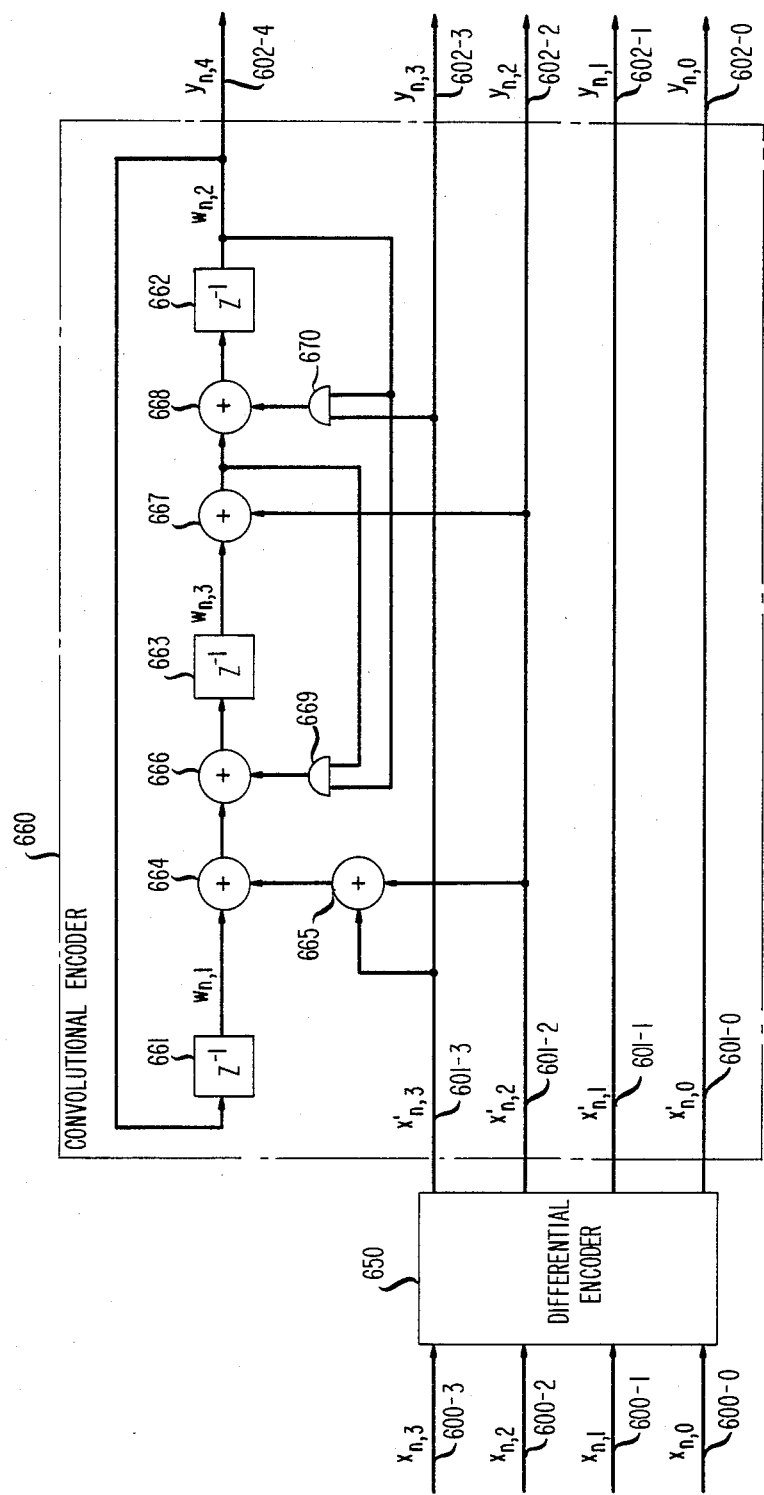
FIG. 6 is a detailed logic diagram of another embodiment of a portion of a transmitter in which a feedback form of non-linear convolutional encoder is used.

A second embodiment of the present invention is shown in FIG. 6. This arrangement also processes input bits in groups of r=4, but in this embodiment, the convolutional encoder is in a feedback form instead of a feedforward form shown in FIG. 2.

In FIG. 6, differential encoder 650 is arranged to process input bits $x_{n,2}$ and $x_{n,3}$, received on lines 600-2 and 600-3, respectively, in the same manner as performed in encoder 250 of FIG. 2. The input/output characteristics of the encoder is the same as those in Table 1. Encoder 650 yields the respective present differentially encoded outputs $x'_{n,2}$ and $x'_{n,3}$ on lines 601-2 and 601-3. Inputs $x_{n,0}$ and $x_{n,1}$ on lines 600-0 and 600-1 are not processed, but are designated $x'_{n,0}$ and $x'_{n,1}$ on lines 601-0 and 601-1, respectively, for consistency.

Convolutional encoder 660 includes three delay elements 661, 662 and 663, the outputs of which are designated $w_{n,1}$, $w_{n,2}$ and $w_{n,3}$ respectively. Four of the five bits ($y_{n,0}$, $y_{n,1}$, $y_{n,2}$ and $y_{n,3}$) output from encoder 660 on lines 602-0 through 602-3, respectively, are the same as the corresponding input bits $x'_{n,0}$, $x'_{n,1}$, $x'_{n,2}$ and $x'_{n,3}$. The fifth output $y_{n,4}$ is equal to $w_{n,2}$. The bits $w_{n,1}$, $w_{n,2}$ and $w_{n,3}$ are updated according to:

$$w_{n+1,1} = w_{n,2} \qquad (1)$$

$$w_{n+1,2} = w_{n,3} \oplus x'_{n,2} \oplus (w_{n,2} x'_{n,3}) \qquad (2)$$

$$w_{n+1,3} = w_{n,1} \oplus x'_{n,2} \oplus x'_{n,3} \oplus [w_{n,2}(w_{n,3} \oplus x'_{n,2})] \qquad (3)$$

where the symbol $\oplus$ represents the exclusive OR function provided by exclusive OR gates 664 through 668. Like encoder 260 of FIG. 2, encoder 660 also includes elements, in this case, AND gates 669 and 670, which make the encoder "non-linear"; the quantities $w_{n,2} x'_{n,3}$ in parenthesis in equation (2) refers to the AND operation performed on these bits. The quantity $[w_{n,2}(w_{n,3} \oplus x'_{n,2})]$ in equation (3) refers to the AND operation performed on $w_{n,2}$ and the result of exclusive OR'ing of bits $w_{n,3}$ and $x'_{n,2}$.

Since the values of three stored bits $w_{n,1}$, $w_{n,2}$ and $w_{n,3}$ are used in encoder 660 to determine its current and future outputs, encoder 660 has $2^3 = 8$ states. As shown in FIG. 7, the current encoder state may be designated by a three bit number representing the stored values of $w_{n,1}$, $w_{n,2}$ and $w_{n,3}$; transitions from each of the 8 current states to four next states is permitted by the logic arrangement in encoder 660. Table 5 fully describes the allowed state transitions and input/output relationship for convolutional encoder 660;

TABLE 5

| Current State $w_{n,1} w_{n,2} w_{n,3}$ | Input $x'_{n,2} x'_{n,3}$ | Next State $w_{n+1,1} w_{n+1,2} w_{n+1,3}$ | Output $y_{n,2} y_{n,3} y_{n,4}$ |
|---|---|---|---|
| 000 | 00 | 000 | 000 |
| 000 | 01 | 001 | 010 |
| 000 | 10 | 011 | 100 |
| 000 | 11 | 010 | 110 |
| 001 | 00 | 010 | 000 |
| 001 | 01 | 011 | 010 |
| 001 | 10 | 001 | 100 |
| 001 | 11 | 000 | 110 |
| 010 | 00 | 100 | 001 |
| 010 | 01 | 111 | 011 |
| 010 | 10 | 110 | 101 |
| 010 | 11 | 101 | 111 |
| 011 | 00 | 111 | 001 |
| 011 | 01 | 100 | 011 |
| 011 | 10 | 101 | 101 |
| 011 | 11 | 110 | 111 |
| 100 | 00 | 001 | 000 |
| 100 | 01 | 000 | 010 |
| 100 | 10 | 010 | 100 |
| 100 | 11 | 011 | 110 |
| 101 | 00 | 011 | 000 |
| 101 | 01 | 010 | 010 |
| 101 | 10 | 000 | 100 |
| 101 | 11 | 001 | 110 |
| 110 | 00 | 101 | 001 |
| 110 | 01 | 110 | 011 |
| 110 | 10 | 111 | 101 |
| 110 | 11 | 100 | 111 |
| 111 | 00 | 110 | 001 |
| 111 | 01 | 101 | 011 |
| 111 | 10 | 100 | 101 |
| 111 | 11 | 111 | 111 |

Proof that convolutional encoder 660 is non-linear can be observed by exclusively OR'ing, bit by bit, certain sets of values of the five bits defining the current state and input of the encoder and the associated sets of values of the three bits defining the next encoder state, using Table 5. If the result does not yield an entry in Table 5, non-linearity is demonstrated. For example, if the set of values {0, 1, 0, 0, 0} of the five bits $w_{n,1}$, $w_{n,2}$, $w_{n,3}$, $x'_{n,2}$ and $x'_{n,3}$ defining current state and input bits are exclusively OR'ed, bit by bit, with another set {0, 1, 0, 0, 1}, the result is {0, 0, 0, 0, 1}; the corresponding sets of values of the three bits $w_{n+1,1}$, $w_{n+1,2}$ and $w_{n+1,3}$ defining next state are {1, 0, 0} and {1, 1, 1}, exclusively OR'ed to give {0, 1, 1}. The result of this process does not correspond to any entry in Table 5.

The five bits $y_{n,0}$ through $y_{n,4}$ output from convolutional encoder 660 on lines 602-0 through 602-4, respectively, are next associated with signalling alphabets in the 32-CROSS signal constellation of FIG. 8, to provide unique coordinates $u_n$, $v_n$ for each output. As with the arrangement of FIGS. 2–4, the arrangement of differential and convolutional encoders of FIG. 6 together with the mapping strategy illustrated in FIG. 8 permit a significant coding gain and the resolution of 90, 180 and 270 degree phase ambiguities of the signal constellation in the receiver.

Proof that 90 degree phase ambiguity of the signal constellation is solved can be seen from Tables 5 and 6 and FIG. 8.

TABLE 6

| Current State $w_{n,1} w_{n,2} w_{n,3}$ | Input $x'_{n,2} x'_{n,3}$ | Next State $w_{n+1,1} w_{n+1,2} w_{n+1,3}$ | Output $y_{n,2} y_{n,3} y_{n,4}$ |
|---|---|---|---|
| 110 | 01 | 110 | 011 |
| 110 | 10 | 111 | 101 |
| 110 | 11 | 100 | 111 |
| 110 | 00 | 101 | 001 |
| 111 | 01 | 101 | 011 |
| 111 | 10 | 100 | 101 |
| 111 | 11 | 111 | 111 |
| 111 | 00 | 110 | 001 |
| 101 | 01 | 010 | 010 |
| 101 | 10 | 000 | 100 |
| 101 | 11 | 001 | 110 |
| 101 | 00 | 011 | 000 |
| 100 | 01 | 000 | 010 |
| 100 | 10 | 010 | 100 |
| 100 | 11 | 011 | 110 |
| 100 | 00 | 001 | 000 |
| 010 | 01 | 111 | 011 |
| 010 | 10 | 110 | 101 |
| 010 | 11 | 101 | 111 |
| 010 | 00 | 100 | 001 |
| 011 | 01 | 100 | 011 |
| 011 | 10 | 101 | 101 |
| 011 | 11 | 110 | 111 |
| 011 | 00 | 111 | 001 |
| 001 | 01 | 011 | 010 |
| 001 | 10 | 001 | 100 |
| 001 | 11 | 000 | 110 |
| 001 | 00 | 010 | 000 |
| 000 | 01 | 001 | 010 |
| 000 | 10 | 011 | 100 |
| 000 | 11 | 010 | 110 |
| 000 | 00 | 000 | 000 |

Note that in Table 6, input pair $x'_{n,2} x'_{n,3}$ to convolutional encoder 660 in each entry (line) is derived from input pair $x'_{n,2} x'_{n,3}$ in the corresponding entry of Table 5 by rotating the latter pair by one position. This rotation is accomplished in light of the specific differential encoder 650 being used. Current state $w_{n,1} w_{n,2} w_{n,3}$ of convolutional encoder 660 in each entry of Table 6 is also changed from the corresponding current state entry in Table 5 according to the relationship shown in Table 7.

TABLE 7

| Current State $w_{n,1}\ w_{n,2}\ w_{n,3}$ of Convolutional Encoder 660 | Corresponding Current State $w_{n,1}\ w_{n,2}\ w_{n,3}$ of Convolutional Encoder 660 When Input Pair $x'_{n,2}\ x'_{n,3}$ is Rotated by One Position |
| --- | --- |
| 000 | 110 |
| 001 | 111 |
| 010 | 101 |
| 011 | 100 |
| 100 | 010 |
| 101 | 011 |
| 110 | 001 |
| 111 | 000 |

Verification that the current state of convolutional encoder 660 in each entry of Table 6 should be changed in the above manner can be seen from the relationship between the next states of convolutional encoder 660 in Tables 5 and 6. Examination of the next states of convolutional encoder 660 in Tables 5 and 6 show that the next state in each entry of Table 6 bears the same relationship as expressed in Table 7 with the next state of the corresponding entry of Table 5. Now, as one can easily verify by inspection of FIG. 8 and Tables 5 and 6, the sequence of signalling alphabets are all rotated by 90 degrees when the sequence of input pairs $x'_{n,2}\ x'_{n,3}$ are all rotated by one position. Therefore, when the received sequence of signalling alphabets is the 90 degree rotated transmitted sequence of signalling alphabets, the effect at the output of the corresponding convolutional decoder is that the elements corresponding to the elements in the sequence of bit pairs $x'_{n,2}\ x'_{n,3}$ at the input to the convolutional encoder are all rotated by one position, and the remaining bit pair corresponding to $x'_{n,0}\ x'_{n,1}$ at the input to the convolutional encoder is not changed. Hence, the original input bits to the differential encoder can be recovered by the corresponding differential decoding operation in the receiver despite 90 degree rotation of the received sequence of signalling alphabets relative to the transmitted sequence of signalling alphabets.

Proof that 180 and 270 degree phase ambiguities of the signal constellation are also solved can be done in a similar manner.

Again as in the first embodiment, signalling alphabets of FIG. 8 are designated as $a_0$-$a_3$, $b_0$-$b_3$, $c_0$-$c_3$, $d_0$-$d_3$, $e_0$-$e_3$, $f_0$-$f_3$, $g_0$-$g_3$ and $h_0$-$h_3$. Eight sets of signalling alphabets are defined such that $A=\{a_i\}$, $B=\{b_i\}$, $C=\{c_i\}$, $D=\{d_i\}$, $E=\{e_i\}$, $F=\{f_i\}$, $G=\{g_i\}$ and $H=\{h_i\}$ for $i=0, 1, 2, 3$. The association of these sets of signalling alphabets with the state transitions of convolutional encoder 660 is clearly indicated in FIG. 7.

Figure 9:
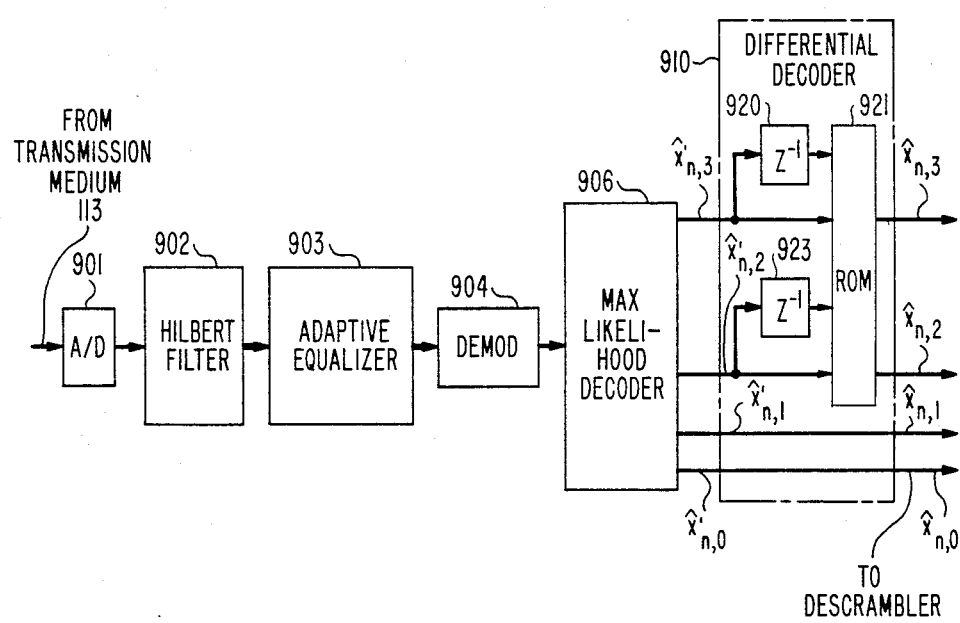
FIG. 9 is a block diagram of a receiver used to recover the original information from a modulated carrier signal processed in accordance with the principles of the present invention.

FIG. 9 illustrates the manner in which a signal modulated in accordance with the outputs of encoders 260 or 660 can be processed to recover the original binary sequence input to the differential encoder. Initially, the analog signal received from transmission medium 113 is converted to digital form in A/D converter 901 and subsequently applied to a Hilbert filter 902 and an adaptive equalizer 903, both of which are well known to those skilled in the art. The equalizer output is demodulated in demodulator 904, and the resultant signal is applied to a maximum likelihood decoder 906 such as a Viterbi decoder which produces a group of four recovered bits $x'_{n,0}$ through $x'_{n,3}$ which correspond to the inputs to encoders 260 or 660. Finally, the recovered bits are applied to a differential decoder 910 to reproduce the original binary input sequence. Decoder 910 may use a read-only memory ROM 921 to operate on both the current outputs $x'_{n,2}$ and $x'_{n,3}$ and the previous outputs $x'_{n-1,2}$ and $x'_{n-1,3}$, delayed in delay elements 923 and 920, respectively, from the decoder 906. This read-only memory is arranged to undo the encoding process performed by encoder 250 or 650, in accordance with the input/output relationships expressed in Table 2.

As stated previously, the association between the convolutional encoder outputs and the signalling alphabets shown in FIGS. 4 and 8 are examples which illustrate the nature of the mapping required to assure that coding gain is preserved and phase ambiguities of the expanded signal constellation being used are solved. In accordance with the present invention, the assignment of convolutional encoder outputs to the $2^{r+1}$ signalling alphabets must concurrently satisfy several principles, keeping in mind that these principles must be used in a way which maximizes the minimum distance between allowable sequences of signalling alphabets at the output of the mapping device.

First, for each of the m possible states of the convolutional encoder, $2^r$ signalling alphabets must correspond to all possible transitions from this state to any of the permitted following m states, and the minimum distance among these $2^r$ signalling alphabets must be larger than that among the complete set of $2^{r+1}$ signalling alphabets.

Second, for each of the m possible states of the convolutional encoder, $2^r$ signalling alphabets must correspond to all possible transitions from any of the permitted previous m states to this state, and the minimum distance among these $2^r$ signalling alphabets must be larger than that among the complete set of $2^{r+1}$ signalling alphabets.

To understand the third principle, certain conventions must first be established. The m possible states of the convolutional encoder are designated as state i, where $i=1,2,3\ldots m$. For each pair of i and j (for $i,j,=1,2,3\ldots m$), if there is a transition from state i to state j in the state transition diagram of the convolutional encoder, then denote $A_{i,j}$ as the set of signalling alphabets corresponding to this transition. Also denote $dis(A_{i,j})$ as the minimum distance among the signalling alphabets in the set $A_{i,j}$. With these conventions in mind, then the third principle requires that all the sets $A_{i,j}$ contain the same number of signalling alphabets, and that the minimum value of $dis(A_{i,j})$ for $i,j=1,2\ldots m$ be maximized.

The fourth principle, which applies to a feedforward convolutional code, can also be best explained by first establishing certain notations, as follows. First, the m possible current states of the convolutional encoder are denoted as states $S_{n,1}\ S_{n,2}\ldots S_{n,p}$, where n denotes the current signalling interval and p is a positive integer such that $2^p$ is equal to m, and $S_{n,i}$ (for $i=1,2,\ldots p$) is the set of previous differentially encoded binary digits which are used to determine the current state. Second, for a first pair of current state $S_{n,1}\ S_{n,2}\ldots S_{n,p}$ and next state $S_{n+1,1}\ S_{n+1,2}\ldots S_{n+1,p}$ denote U as the set of signalling alphabets corresponding to the transition between these two states and $V_1$, $V_2$ and $V_3$ as the sets of signalling alphabets obtained by rotating all the signalling alphabets in set U by 90, 180 and 270 degrees, respectively. Third, define $Q_{i,j,k}$ (for $i=n, n+1, j=1,2\ldots p$, and $k=1, 2, 3$) as the bit corresponding to bit $S_{i,j}$ which results when all of the output bits from the differential encoder, which affect the state transitions of the convolutional encoder and which were subject to rotation during the differential encoding process, are rotated by 1, 2 and 3 positions, respectively. With these notations in mind, it is then required that the sets of signalling alphabets corresponding to the transitions from states $Q_{n,1,k}Q_{n,2,k} \ldots Q_{n,p,k}$ to states $Q_{n+1,1,k}Q_{n+1,2,k} \ldots Q_{n+1,p,k}$, for k=1,2,3, be sets $V_1$, $V_2$ and $V_3$. The correspondence between the three state transitions for k=1,2,3 and the three sets $V_1$, $V_2$ and $V_3$ of signalling alphabets must be one-to-one, but set $V_2$ must correspond to the transition for k=2. Once this correspondence between the three state transitions and the three sets of signalling alphabets mentioned above is established for the first pair of current state $S_{n,1} S_{n,2} \ldots S_{n,p}$ and the next state $S_{n+1,1} S_{n+1,2} \ldots S_{n+1,p}$, the same relationship must be held for the remaining pairs of current and next states. In order to make this principle feasible, it is required that a non-linear convolutional code be used.

The fifth principle applies only to the feedback convolutional code of the type shown in FIGS. 6–8. In order to obtain a feedback convolutional code, the state transition diagram obtained in accordance with the foregoing four principles for a feedforward code is used as a starting point. This principle further requires that the two bits (for example, $y_{n,2}$ and $y_{n,3}$ in FIG. 6) output from the convolutional encoder, which have been rotated during the differentially encoding process and which affect the state transitions of the convolutional encoder, be assigned to the signalling alphabets such that if a given two bit value is assigned to a particular alphabet, the corresponding alphabets which are obtained from rotations of the given alphabet by 90, 180 and 270 degrees are assigned two bit values such that the four two bit values form a sequence in which the differences between the first and second elements, the second and third elements, the third and fourth elements, and the fourth and first elements of the sequence correspond to a one or three position differential as defined with respect to the differential encoder. All of the differences must correspond to the same position differential. This correspondence, once established for the first selected signalling alphabet, must apply to all the remaining signalling alphabets.

The foregoing five principles govern the assignment of sets of signalling alphabets to the state transitions of the convolutional encoder, or more precisely, to the sets of output bit combinations associated with state transitions of the convolutional encoder. To further assign the signalling alphabets in a set to the output bit combinations in an associated set, we need the following sixth principle. Note that the output bit combination in a set is determined by the group, denoted as W, of differentially encoded bits appearing at the input of the convolutional encoder, which does not affect the state transition of the convolutional encoder. The sixth principle, in the simplest case when the bits in group W are not processed in both the differential and convolutional encoders, requires that the same set of values of the bits in group W be assigned to any set of four signalling alphabets which has the same radius but are 90 degrees apart. However, processing in the differential and convolutional encoders, which allows the original bits input to the differential encoder to be recovered in the receiver despite a rotation of the signal constellation, can be used. This processing may include one dimensional differential encoding of one or more input bits, or two dimensional differential encoding of pairs of bits.

Accordingly, the association of values of the bits in group W with the signalling alphabets may be done in various other ways.

Based on the six principles cited above, the achievable maximized minimum distance between allowable sequences of signalling alphabets at the output of the mapping device remains the same as that which can be achieved by only using rules required in Ungerboeck's technique. Hence, the present invention permits preservation of coding gain while the effect of the phase ambiguities of the expanded signal constellation being used is removed.

Application of the foregoing principles to the embodiments shown in FIGS. 2–4 and FIGS. 6–8 will illustrate more clearly their meaning. In the constellations of FIGS. 4 and 8, eight sets A, B, C, D, E, F, G and H of signalling alphabets are defined such that for i=0,1,2,3, $A=\{a_i\}$, $B=\{b_i\}$, $C=\{c_i\}$, $D=\{d_i\}$, $E=\{e_i\}$, $F=\{f_i\}$, $G=\{g_i\}$ and $H=\{h_i\}$. Observation of FIGS. 3, 4, 7 and 8 reveals that transitions originating from the same state receive signals either from the union of sets A, B, C and D or the union of sets E, F, G and H and the minimum distance among the signalling alphabets in the union of sets A, B, C and D or the union of sets E, F, G and H is larger than the minimum distance among the complete set of signalling alphabets, thus satisfying the first principle.

Likewise, transitions joining in the same state receive signals from either the union of sets A, B, C and D or the union of sets E, F, G and H, satisfying the second principle.

Sets A, B, C, D, E, F, G and H all have four elements, satisfying the first requirement in the third principle. The third principle further requires that the smallest of the minimum distances between the points in each set A through H be maximized, which is verified by inspection of FIGS. 4 and 8; if the location of any signalling alphabet in a set is switched with an alphabet in another set, it is quite clear that the smallest of the minimum distances between the points in each newly created set A through H will be undesirably reduced, in violation of the principle.

In the arrangement of FIGS. 2 and 3, m=8, p=3, and the previous differentially encoded binary digits which are used to determine the current state are $x'_{n-2,3}$, $x'_{n-1,3}$ and $x'_{n-1,2}$. For given values of $x'_{n-2,3}$, $x'_{n-1,3}$ and $x'_{n-1,2}$ such as 001, and for a transition to (arbitrarily chosen) next state 010, set U of signalling alphabets associated with this state transition is set A. Inspection of FIG. 4 reveals that when set U is rotated by 90, 180 and 270 degrees, the resulting sets $V_1$, $V_2$ and $V_3$ of signalling alphabets will be sets E, C and G, respectively. If the bits $x'_{n-2,3}$, $x'_{n-1,2}$, $x'_{n-1,3}$, $x'_{n,2}$ and $x'_{n,3}$ input to the convolutional encoder 260 are all rotated by the same one, two and three position differentials which are defined with respect to differential encoder 250, the resulting state transitions corresponding to the state transition from state 001 to state 010 are (1) from state 111 to state 101, (2) from state 000 to state 011, and (3) from state 110 to state 100, respectively. Inspection of FIG. 3 reveals that the sets of signalling alphabets associated with the three state transitions just mentioned are sets E, C and G, respectively, which are sets $V_1$, $V_2$ and $V_3$ as defined above. It can be seen that the same correspondence exists when any other state transition is chosen: if the process stated above is repeated, the correspondence between sets $V_1$, $V_2$ and $V_3$ and the resulting three state transitions when the bits input to the convolutional encoder are rotated by one, two and three position differentials will remain unchanged, satisfying the fourth principle.

Inspection of FIGS. 3 and 7 shows that the allowable state transitions and the sets of signalling alphabets associated with these transitions are the same in both figures. Furthermore, the pair of values of the two bits $y_{n,2}$ and $y_{n,3}$ output from convolutional encoder 660, which have been differentially encoded and which affect the state transitions of the convolutional encoder, associated with a signalling alphabet $a_0$ (for example) is 00, as shown in FIG. 8. If this alphabet is rotated by 90, 180 or 270 degrees, the alphabets $e_o$, $c_o$ and $g_o$, respectively, are obtained, having 01, 10 and 11 respectively, for $y_{n,2} y_{n,3}$. The differences between the first and second, second and third, third and fourth, and fourth and first elements of the sequence 00, 01, 10, 11 are all one position differential, as defined with respect to differential encoder 650. It can be seen from FIG. 8 that the four element sequence formed using bit pairs $y_{n,2} y_{n,3}$ associated with signalling alphabets rotated by 90, 180 and 270 degrees from any given starting signalling alphabet also has a one position differential between successive elements, satisfying the fifth principle.

In FIGS. 2 and 6, the differentially encoded bits which do not affect the state transition of the convolutional encoder are $x'_{n,0}$ and $x'_{n,1}$. These two bits are directly taken from the input bits $x_{n,0}$ and $x_{n,1}$ of differential encoders 250 and 650, and carried to the output bits $y_{n,0}$ and $y_{n,1}$ of convolutional encoders 260 and 660. It can be seen from FIGS. 4 and 8 that the same set of values of bits $y_{n,0}$ and $y_{n,1}$ (or equivalently, bits $x'_{n,0}$ and $x'_{n,1}$) is always assigned to any four signalling alphabets which lie on the same radius but 90 degrees apart, satisfying the sixth principle.

Figure 10:
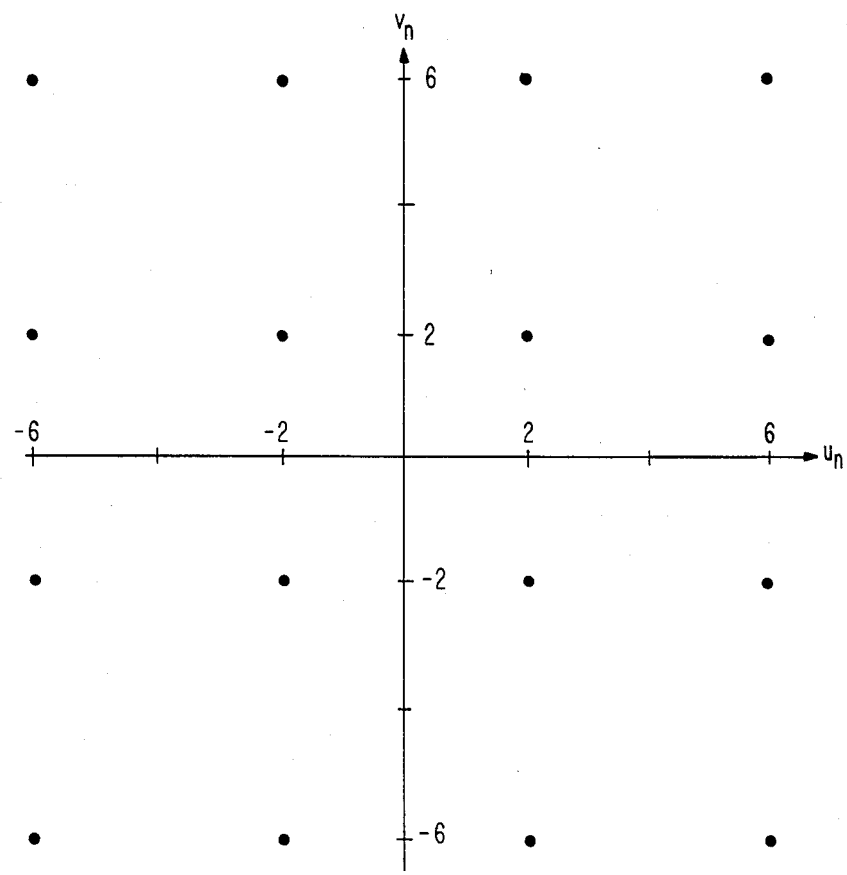
FIG. 10 illustrates a conventional 16-point QAM signal constellation for the purposes of comparison.

For the 8-state codes illustrated in the embodiments of FIGS. 2–4 and 6–8, the average signal power is 20 and the minimum distance between allowable sequences of signalling alphabets is also 20. In order to gauge its usefulness, it is to be noted that in the uncoded case, signal constellations of 16 signalling alphabets should be used, one of which (referred to as 16-QAM) is shown in FIG. 10. The average signal power of this 16-QAM constellation is 40 and the corresponding minimum distance is 16. Hence, the coding gain in minimum distance of the 8-state codes used in the embodiments of FIGS. 2–4 and 6–8 over that obtained using uncoded 16-QAM, given the same average power, is:

$$10 \log_{10}\left(\frac{20}{20} / \frac{16}{40}\right) = 3.98 \text{ dB}.$$

Modem implementations using these codes were tested. Experimentally, it was found that, given the same errorevent probability, these arrangements showed about 4 dB gain in signal to noise ratio compared to the uncoded 16-QAM.

There are certain advantages in using the feedback non-linear convolutional code shown in FIGS. 6–8 instead of the feedforward non-linear convolutional code shown in FIGS. 2–4.

First, in the feedback code, the differentially encoded bits $x'_{n,0}$, $x'_{n,1}$, $x'_{n,2}$, $x'_{n,3}$ are directly carried to the output of the convolutional encoder. Hence, the receiver has the option of not using a convolutional decoder. However, if convolutional decoder is not used, then the performance of the receiver is worse than that of the uncoded case due to the fact that a larger number of signalling alphabets is used in the coded case than in the uncoded case. To avoid this disadvantage, one can arrange the transmitter to optionally transmit 16 signalling alphabets corresponding to the 16 different patterns which may be assumed by $y_{n,0} y_{n,1} y_{n,2} y_{n,3} y_{n,4}$ with the last (redundant) bit $y_{n,4}$ fixed at either 0 or 1. However, when this option is selected, the receiver must know which value is used for the redundant bit in the transmitter. This arrangement can also be practiced in a feedback convolutional code when input bits are grouped in groups of other than four bits, by treating the redundant bit in a similar manner.

Second, in the convolutional decoder of the feedback code, path history for each state can be represented in terms of the estimated coded bits $y_{n,0}$, $y_{n,1}$, $y_{n,2}$, $y_{n,3}$, $y_{n,4}$, and the estimated differentially encoded information bits $x'_{n,0}$, $x'_{n,1}$, $x'_{n,2}$ and $x'_{n,3}$ can be extracted from $y_{n,0}$, $y_{n,1}$, $y_{n,2}$, $y_{n,3}$ and $y_{n,4}$ by simply letting $$x'_{n,i} = y_{n,i} \quad i=0,1,2,3.$$

This fact saves some complexity in the receiver if one wants to use delayed tentative decision $y_{n,i}$, $i=0,1,\ldots 4$, to update the phase-locked loop and the adaptive equalizer in the receiver.

Various extensions and adaptations of the present invention may be made by those skilled in the art, and for this reason, it is intended that the present invention be limited only by the appended claims. These extensions fall into several categories, and are summarized below.

Figure 11:
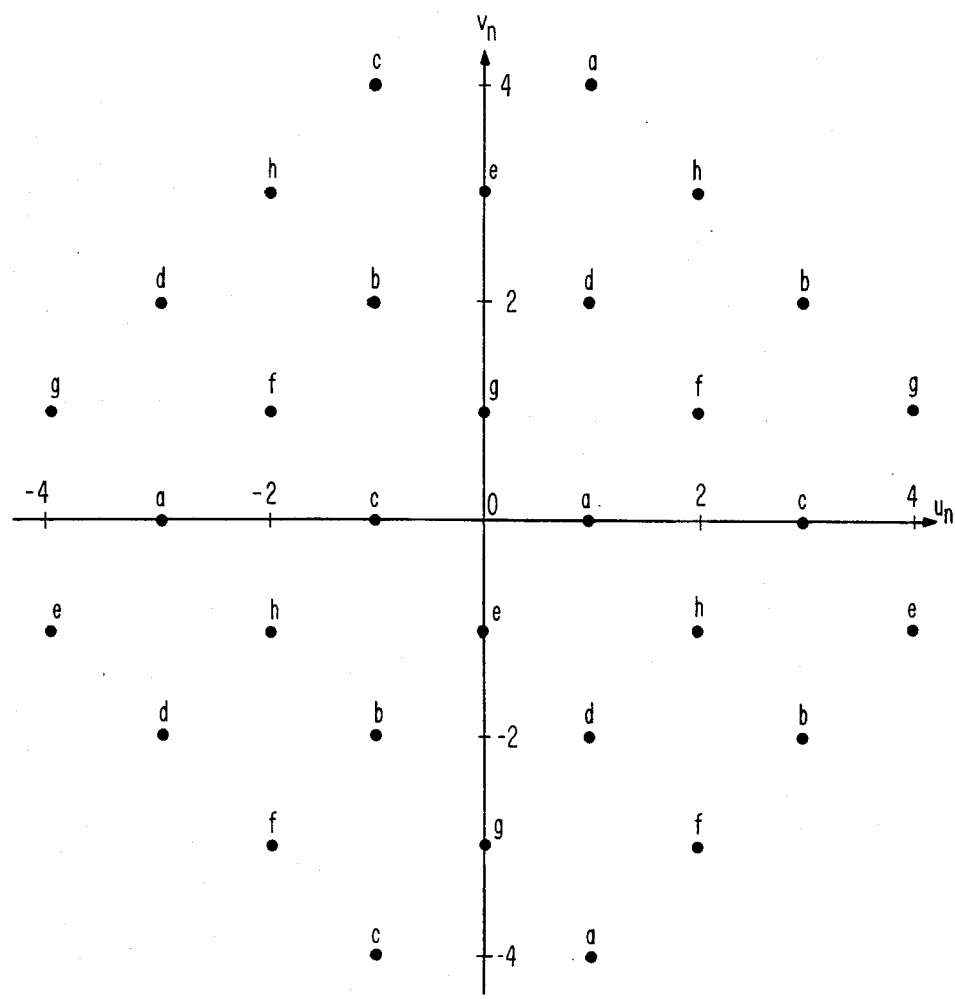
FIG. 11 illustrates an expanded signal constellation which is a 45 degree rotated version of the signal constellations of FIGS. 4 and 8.
Figure 12:
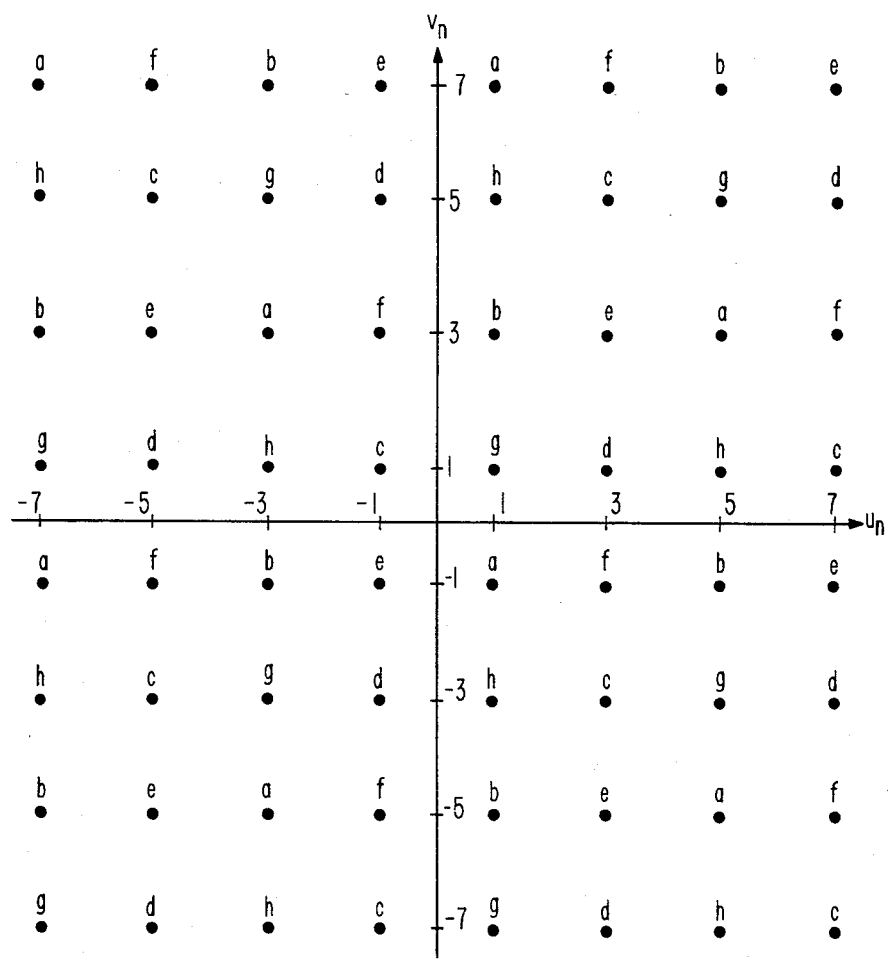
FIGS. 12 and 13 illustrate expanded signal constellations containing 64 and 128 alphabets, respectively.
Figure 13:
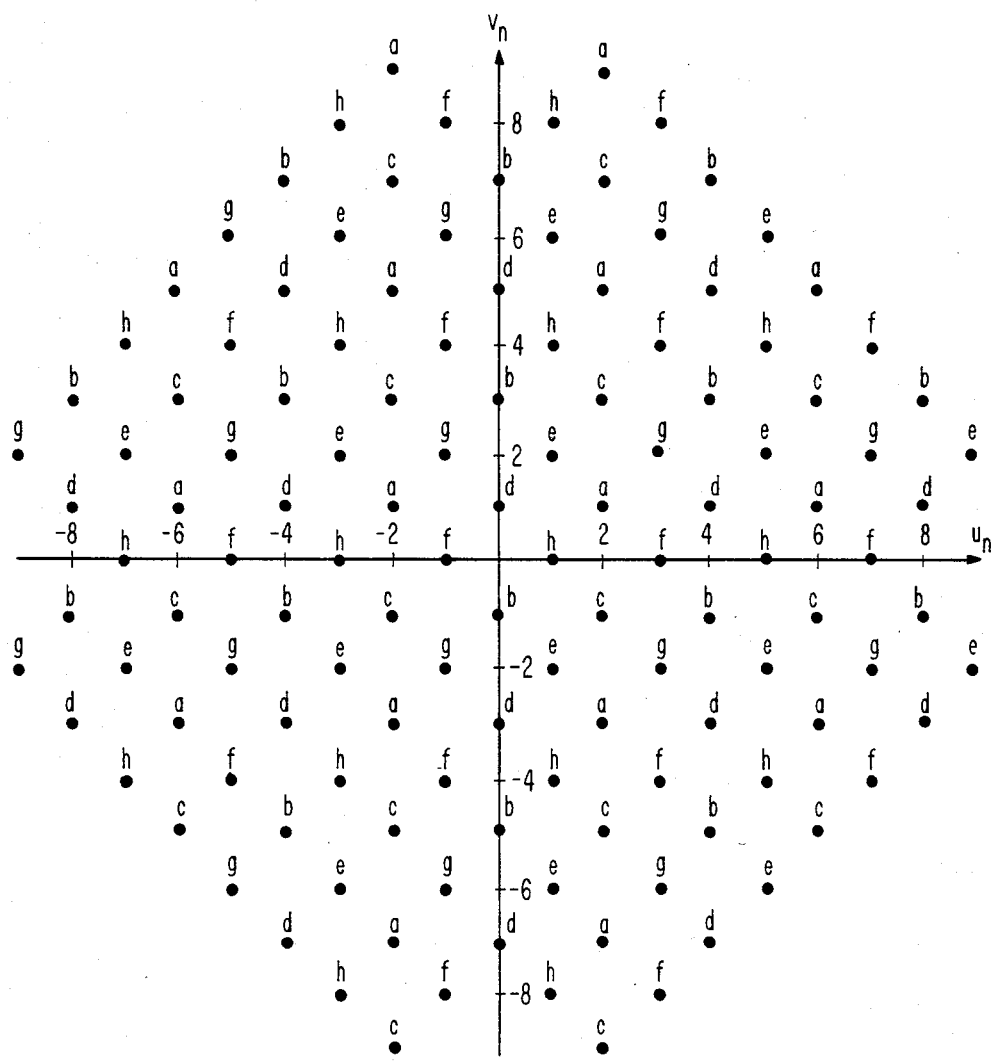

First, while a 32 point cross signal constellation is shown in FIGS. 4 and 8, various other constellations can be used instead, as long as they have the desired properties. As stated previously, the expanded constellation must permit only 90, 180 and 270 degrees phase ambiguities, so that rotations of any other amount of degrees will not give the original expanded constellation. For example, the signal constellations shown in FIGS. 11, 12 and 13 can also be used for input bits grouped in groups of $r=4$, 5 and 6 bits, respectively. The constellation of FIG. 11 is a 45 degree rotated version of the constellations shown in FIGS. 4 and 8. For each of these constellations, the signalling alphabets are partitioned into 8 sets designated by the letters A through H; each set consists of the alphabets designated by the corresponding lower case letter. These sets of alphabets can be used in conjunction with the state transition diagrams of FIGS. 3 and 7 if the first four input bits in each group are still processed as shown in FIGS. 2 and 6, respectively, and the added input bits (if any) in each group are not processed. For a given value of r, the expanded signal constellation must, of course, include $2^{r+1}$ alphabets.

Second, while look-up circuits (ROMs) were shown for implementing differential encoding and decoding, it is well known to use equivalent circuits. Furthermore, while the differential encoder of FIG. 2 does not differentially encode inputs on lines 202-1 and 202-0, these inputs can be differentially coded also, as long as corresponding differential decoding is provided in the receiver. Note that for different arrangements of differential encoding, appropriate modifications may be required in the mapping device.

Third, many different implementations and arrangements for providing non-linear convolutional encoding are possible, as long as they satisfy the principles set out above. Also, a convolutional encoder with other than 8 states may be used. In general, the mapping of the encoder output to the signal constellation may then require appropriate modification.

Fourth, the manner in which the outputs of the convolutional encoder are assigned to the signalling alphabets can be modified in various ways which do not affect the ability of the present invention to yield the desired results. Some changes can indeed be made without modifying the arrangement of the differential and convolutional encoders. Specifically, if k bits output from the differential encoder, which do not affect the state transition of the convolutional encoder, appear at the input to the mapping device, these bits can form $2^k$ combinations. These $2^k$ combinations can then be arbitrarily assigned to the $2^k$ signalling alphabets in a first set. In addition, the initial association between a particular set of signalling alphabets and a particular state transition can also be made arbitrarily, but the remaining associations must then follow the rules stated above. In general, a mapping of the outputs of the convolutional encoder to the signalling alphabets is acceptable if rotation of some of the bits appearing at the input of the convolutional encoder results in rotation by 90, 180 or 270 degrees of the sequence of signalling alphabets produced at the output of the mapping device.

It also is to be noted here that the functions performed in the differential encoder, convolutional encoder and mapping device are all digital, and that it is possible to arrange a read-only memory and appropriate delay devices to receive the original input sequence and generate the appropriate coordinates $u_n$ and $v_n$ in accordance with the particular relationships expressed in the foregoing detailed description. Such an implementation would nevertheless use the principles of the present invention to derive the information needed to initially enter the ROM. Alternatively, all of the operations performed by the differential and convolutional encoders and the mapping device can be performed in finite state logic, or a combination of logic and lookup tables can be used.

What is claimed is:

1. A method for transmitting a bit sequence by modulating a carrier signal to sequentially assume one of a plurality of pairs of discrete signal values, comprising the steps of:
    (a) differentially encoding bits in each group of r bits in said sequence by rotating the values of bits in the previous differentially encoded r bit group in accordance with the values of bits in the current r bit group,
    (b) expanding each differentially encoded r bit group into a group of r+1 bits by a non-linear convolutional coding process utilizing m internal states, the current state of said convolutional code being determined by p stored bits, where $2^p = m$, said p stored bits being functions of the previous bits input to said convolutional encoder and affecting the output of said convolutional encoder,
    (c) selecting one of $2^{r+1}$ signalling alphabets from a signal constellation, each alphabet corresponding to a pair of discrete signal values, said selection being made as a function of the r+1 bit group so that $2^r$ signalling alphabets correspond to all permitted transitions from each current internal state of said convolutional coding process to m possible next states of said convolutional coding process, and so that the $2^r$ signalling alphabets have a larger minimum distance from each other than the minimum distance within the complete set of $2^{r+1}$ signalling alphabets, and
    (d) transmitting the pairs of discrete signal values corresponding to the selected signalling alphabets in sequence,
    wherein said signal constellation is arranged so that the same signal constellation is obtained when the original constellation is rotated by 90, 180 or 270 degrees, and wherein
    rotation of said constellation by 90, 180 or 270 degrees produces the same effect on said transmitted discrete signal values as rotation of said differentially encoded bits in each r bit group.

2. A technique for modulating in-phase and quadrature phase carriers in accordance with an applied sequence of binary digits, including the steps of:
    (a) differentially encoding bits in each current group of r bits in said applied sequence by rotating the values of previous differentially encoded bits by a position differential determined by said bits in said current group,
    (b) encoding each differentially encoded r bit group into an associated r+1 bit group in accordance with a multi-state non-linear convolutional code, the current state of said convolutional code being determined in accordance with bits in previous differentially encoded r bit groups,
    (c) associating each expanded r+1 bit group produced by said convolutional code with a signalling alphabet in a two-dimensional constellation, and
    (d) modulating said in-phase and quadrature phase carriers in accordance with the coordinates of said signalling alphabets,
    wherein said signalling alphabets are arranged in said constellation such that
    (1) the $2^r$ alphabets which correspond to all permitted transitions from each state of said convolutional code to m possible following states of said convolutional code, have a larger minimum distance than the complete set of $2^{r+1}$ signalling alphabets,
    (2) the $2^r$ alphabets which correspond to all permitted transitions from m possible previous states of said convolutional code to each current state of said convolutional code have a larger minimum distance than the complete set of $2^{r+1}$ signalling alphabets,
    (3) the coordinates of all signalling alphabets in said constellation are preserved when said constellation is rotated by 90, 180 or 270 degrees, and
    (4) rotation of said differentially encoded bits in each r bit group results in association of the produced r+1 bit group with a signalling alphabet in said rotated constellation which corresponds to the alphabet in the original constellation associated with the r+1 bit group produced without rotation.

3. A technique for modulating in-phase and quadrature phase carriers in accordance with an applied sequence of binary digits, including the steps of:
    (a) differentially encoding at least some of the binary digits in each current group of r bits in said applied sequence by rotating the values of previous differentially encoded binary digits by a position differential determined by said binary digits in said current group, (b) expanding c bits in each group of r differentially encoded bits into a group of c+1 bits by a non-linear convolutional encoding process utilizing m internal states, the current state of said convolutional code being determined by p stored bits, where $2^p = m$, said p stored bits being determined by bits in previous differentially encoded r bit groups, said c bits including only bits in each r bit group which are differentially encoded, (c) selecting one of $2^{r+1}$ signalling alphabets from a signal constellation as a function of the expanded r+1 bit group which includes said c+1 convolutionally encoded bits and the remaining r-c bits produced by said differential encoding step, the selection being made so that $2^r$ signalling alphabets correspond to all permitted transitions from each current internal state of the convolutional coding process to m possible next states of the convolutional coding process, and that the $2^r$ signalling alphabets have a larger minimum distance from each other than the minimum distance within the complete set of $2^{r+1}$ signalling alphabets, and (d) modulating said in-phase and quadrature-phase carriers in accordance with the sequence of selected signalling alphabets, wherein said signalling alphabets form a constellation having 90, 180 and 270 degree symmetry, the location of each signalling alphabet in said constellation being uniquely defined by its associated coordinates, the mapping between expanded r+1 bit groups and said alphabets in said signal constellation being arranged so that rotation of said signal constellation by 90, 180 or 270 degrees results in selection of the same signalling alphabet as rotation of those differentially encoded bits in each r bit group included among the c convolutionally encoded bits.

4. A method for transmitting a bit sequence by modulating in-phase and quadrature phase carriers to sequentially assume one of a plurality of discrete values in accordance with the coordinates associated with a sequence of signalling alphabets, comprising the steps of:

(a) differentially encoding at least two bits in each group of r sequential bits by rotating the values of the corresponding bits in previous differentially encoded r bit group in accordance with the values of said at least two bits, (b) expanding each differentially encoded r bit group into a group of r+1 bits by a non-linear convolutional coding process utilizing multiple internal states, the current state of said convolutional code being determined by bits in previous differentially encoded r bit groups, (c) selecting one out of $2^{r+1}$ signalling alphabets from a signal constellation as a function of each expanded r+1 bit group, the selection being made so that $2^r$ signalling alphabets correspond to all permitted transitions from each current internal state of the coding process to possible follower states and that the $2^r$ signalling alphabets have a larger minimum distance from each other than the minimum distance within the complete set of $2^{r+1}$ signalling alphabets, and (d) modulating said in-phase and quadrature phase carriers in accordance with the sequence of selected signalling alphabets, wherein said signalling alphabets form a constellation having 90, 180 and 270 degree symmetry, the location of each signalling alphabet in said constellation being uniquely defined by its associated coordinates, the mapping between each expanded r+1 bit group and said alphabet in said constellation being arranged so that rotation of said signal constellation by 90, 180 or 270 degrees results in selection of the same signalling alphabet as rotation of said at least two differentially encoded bits in each r bit group.

5. A technique for modulating in-phase and quadrature phase carriers to assume a sequence of discrete values $u_n$ and $v_n$, respectively, in accordance with an applied sequence of bits, including:

(1) expanding each current group of r bits in said applied sequence into a sequence of r+1 bits in accordance with the state of an m-state convolutional code, each of said m-states being defined by p stored bits, where $2^p = m$, said p stored bits being determined by bits in previous r bit groups, (2) selecting said discrete values in accordance with the coordinates of the one of $2^{r+1}$ signalling alphabets associated with the values of the bits in each expanded r+1 bit group, said selection being made so that $2^r$ signalling alphabets correspond to all permitted transitions from each current one of said m states to m possible next states, and so that the minimum distance between said $2^r$ signalling alphabets is larger than the minimum distance between the complete set of $2^{r+1}$ signalling alphabets, and (3) modulating said in-phase and quadrature-phase carriers in accordance with said selected discrete values, characterized in that (4) said technique further includes the step of differentially encoding at least one pair of bits in each group of r bits before said expanding step by rotating the values of a pair of previous differentially encoded bits by a position differential determined by the values of said bits in said at least one pair of bits, (5) said expanding step includes determining said p bits which define said next state as a non-linear function of said p bits which define said current state and bits in said current r bit group, and (6) said technique further includes forming said signalling alphabets in a constellation with only 90, 180 and 270 degree symmetry such that rotation of those of said differentially encoded bits processed in said expanding step has the same effect as rotation of said signalling alphabets by 90, 180 or 270 degrees.

6. A technique for modulating in-phase and quadrature phase carriers in accordance with a sequence of binary digits, by associating each group of r binary digits with a signalling alphabet in a constellation, the coordinates of each alphabet determining the amplitudes of said in-phase and quadrature phase modulations, respectively, including the steps of:

(a) rotating at least some of the binary digits in each of the r bit groups of binary digits output from a differential encoder in accordance with the values of the corresponding bits in each current r bit group, (b) expanding each differentially encoded r bit group into an associated group of r+1 bits by a non-linear convolutional code utilizing m states, the current state of said convolutional code being determined by p bits in previous differentially encoded r bit groups, where p is an integer such that $2^p = m$, and (c) selecting for each of said expanded r+1 bit groups a particular signalling alphabet in said constellation, said selection being from a set of $2^r$ alphabets which correspond to all permitted transitions from said current state of said convolutional code to m possible next states of said convolutional code, alphabets in said $2^r$ set having a larger minimum distance from each other than alphabets in the complete set of $2^{r+1}$ alphabets, wherein said constellation is chosen such that the same constellation is obtained when the original constellation is rotated by 90, 180 or 270 degrees, and a different constellation is obtained for other amounts of rotation, and wherein the mapping between said signalling alphabets and said groups of r+1 bits is arranged such that rotation of the sequence of mapped signalling alphabets by 90, 180 or 270 degrees has the same effect on said modulated carriers as is obtained by rotating consistently at least some of said differentially encoded bits in each r bit group before said expansion.

7. A technique for modulating in-phase and quadrature phase carriers to assume a sequence of discrete values $u_n$ and $v_n$, respectively, in accordance with an applied sequence of bits, including:

(1) expanding each current group of r bits in said applied sequence into a group of r+1 bits in accordance with the state of an m-state convolutional code, (2) selecting said discrete values in accordance with the coordinates of the one of $2^{r+1}$ signalling alphabets associated with the values of the bits in each expanded r+1 bit group, said selecting being made so that $2^r$ signalling alphabets correspond to all permitted transitions from each current one of said m states to m possible next states, and so that the minimum distance between said $2^r$ signalling alphabets is larger than the minimum distance between the complete set of $2^{r+1}$ signalling alphabets, and (3) modulating said in-phase and quadrature-phase carriers in accordance with said selected discrete values, characterized in that (4) said technique further includes the step of differentially encoding at least one pair of bits in each group of r bits before said expanding step by rotating the values of a pair of previous differentially encoded bits by a position differential determined by the values of said bits in said at least one pair of bits, (5) said expanding step includes determining bits in said r+1 bit group as a non-linear function of bits in said current and previous r bit groups, and (6) said technique further includes forming said signalling alphabets in a constellation with only 90, 180 and 270 degree symmetry such that rotation of said differentially encoded bits processed in said expanding step has the same effect as rotation of said signalling alphabets by 90, 180 or 270 degrees.

8. Apparatus for transmitting a bit sequence by modulating a carrier signal to sequentially assume one of a plurality of pairs of discrete signal values, comprising (a) means for differentially encoding bits in each group of r bits in said sequence by rotating the values of bits in the previous differentially encoded r bit group in accordance with the values of bits in the current r bit group, (b) means for expanding each differentially encoded r bit group into a group of r+1 bits by a non-linear convolutional coding process utilizing m internal states, the current state of said convolutional code being determined by p stored bits, where $2^p = m$, said p stored bits being functions of the previous bits input to said convolutional encoder and affecting the output of said convolutional encoder, (c) means for selecting one of $2^{r+1}$ signalling alphabets from a signal constellation, each alphabet corresponding to a pair of discrete carrier signal values, said selection means being arranged so that $2^r$ signalling alphabets correspond to all permitted transitions from each current internal state of said convolutional coding process to m possible next states of said convolutional coding process, and so that the $2^r$ signalling alphabets have a larger minimum distance from each other than the minimum distance within the complete set of $2^{r+1}$ signalling alphabets, and (d) means for transmitting the pairs of discrete carrier signal values corresponding to the selected signalling alphabets in sequence, wherein said signal constellation is arranged so that the same signal constellation is obtained when the original constellation is rotated by 90, 180 or 270 degrees, and wherein rotation of said constellation by 90, 180 or 270 degrees produces the same effect on said transmitted discrete signal values as rotation of said differentially encoded bits in each r bit group.

9. Apparatus for modulating in-phase and quadrature phase carriers in accordance with an applied sequence of binary digits, including (a) means for differentially encoding bits in each current group of r bits in said applied sequence by rotating the values of previous differentially encoded bits by a position differential determined by said bits in said current group, (b) means for encoding each differentially encoded r bit group into an associated r+1 bit group in accordance with a multi-state non-linear convolutional code, the current state of said convolutional code being determined in accordance with bits in previous differentially encoded r bit groups, (c) means for associating each expanded r+1 bit group produced by said convolutional code with a signalling alphabet in a two-dimensional constellation, and (d) means for modulating said in-phase and quadrature phase carriers in accordance with the coordinates of said signalling alphabets, wherein said signalling alphabets are arranged in said constellation such that (1) the $2^r$ alphabets which correspond to all permitted transitions from each state of said convolutional code to m possible following states of said convolutional code, have a larger minimum distance than the complete set of $2^{r+1}$ signalling alphabets, (2) the $2^r$ alphabets which correspond to all permitted transitions from m possible previous states of said convolutional code to each current state of said convolutional code have a larger minimum distance than the complete set of $2^{r+1}$ signalling alphabets, (3) the coordinates of all signalling alphabets in said constellation are preserved when said constellation is rotated by 90, 180 or 270 degrees, and (4) rotation of said differentially encoded bits in each r bit group results in association of the produced r+1 bit group with a signalling alphabet in said rotated constellation which corresponds to the alphabet in the original constellation associated with the r+1 bit group produced without rotation.

10. Apparatus for modulating in-phase and quadrature phase carriers in accordance with an applied sequence of binary digits, including (a) means for differentially encoding at least some of the binary digits in each current group of r bits in said applied sequence by rotating the values of previous differentially encoded binary digits by a position differential determined by said binary digits in said current group, (b) means for expanding c bits in each group of r differentially encoded bits into a group of c+1 bits by a non-linear convolutional encoding process utilizing m internal states, the current state of said convolutional code being determined by p stored bits, where $2^p=m$, said p stored bits being determined by bits in previous differentially encoded r bit groups, said c bits including only bits in each r bit group which are differentially encoded, (c) means for selecting one of $2^{r+1}$ signalling alphabets from a signal constellation as a function of the expanded r+1 bit group which includes said c+1 convolutionally encoded bits and the remaining r−c bits produced by said differential encoding step, said selecting means being arranged so that $2^r$ signalling alphabets correspond to all permitted transitions from each current internal state of the convolutional coding process to m possible next states of the convolutional coding process, and that the $2^r$ signalling alphabets have a larger minimum distance from each other than the minimum distance within the complete set of $2^{r+1}$ signalling alphabets, and (d) means for modulating said in-phase and quadrature-phase carriers in accordance with the sequence of selected signalling alphabets, wherein said signalling alphabets form a constellation having 90, 180 and 270 degree symmetry, the location of each signalling alphabet in said constellation being uniquely defined by its associated coordinates, the mapping between expanded r+1 bit groups and said alphabets in said signal constellation being arranged so that rotation of said signal constellation by 90, 180 or 270 degrees results in selection of the same signalling alphabet as rotation of those differentially encoded bits in each r bit group included among the c convolutionally encoded bits.

11. Apparatus for transmitting a bit sequence by modulating in-phase and quadrature phase carriers to sequentially assume one of a plurality of discrete values in accordance with the coordinates associated with a sequence of signalling alphabets, comprising (a) means for differentially encoding at least two bits in each group of r sequential bits by rotating the values of the corresponding bits in previous differentially encoded r bit group in accordance with the values of said at least two bits, (b) means for expanding each differentially encoded r bit group into a group of r+1 bits by a non-linear convolutional coding process utilizing multiple internal states, the current state of said convolutional code being determined by bits in previous differentially encoded r bit groups, (c) means for selecting one out of $2^{r+1}$ signalling alphabets from a signal constellation as a function of each expanded r+1 bit group, the selection being made so that $2^r$ signalling alphabets correspond to all permitted transitions from each current internal state of the coding process to possible follower states and that the $2^r$ signalling alphabets have a larger minimum distance from each other than the minimum distance within the complete set of $2^{r+1}$ signalling alphabets, and (d) means for modulating said in-phase and quadrature phase carriers in accordance with the sequence of selected signalling alphabets, wherein said signalling alphabets form a constellation having 90, 180 and 270 degree symmetry, the location of each signalling alphabet in said constellation being uniquely defined by its associated coordinates, the mapping between each expanded r+1 bit group and said alphabet in said constellation being arranged so that rotation of said signal constellation by 90, 180 or 270 degrees results in selection of the same signalling alphabet as rotation of said at least two differentially encoded bits in each r bit group.

12. Apparatus for modulating in-phase and quadrature phase carriers to assume a sequence of discrete values $u_n$ and $v_n$, respectively, in accordance with an applied sequence of bits, including:

(1) means for expanding each current group of r bits in said applied sequence into a sequence of r+1 bits in accordance with the state of an m-state convolutional code, each of said m-states being defined by p stored bits, where $s^p=m$, said p stored bits being determined by bits in previous r bit groups, (2) means for selecting said discrete values in accordance with the coordinates of the one of $2^{r+1}$ signalling alphabets associated with the values of the bits in each expanded r+1 bit group, said selection being made so that $2^r$ signalling alphabets correspond to all permitted transitions from each current one of said m states to m possible next states, and so that the minimum distance between said $2^r$ signalling alphabets is larger than the minimum distance between the complete set of $2^{r+1}$ signalling alphabets, and (3) means for modulating said in-phase and quadrature-phase carriers in accordance with said selected discrete values, characterized in that (4) said apparatus further includes means for differentially encoding at least one pair of bits in each group of r bits applied to said expanding means by rotating the values of a pair of previous differentially encoded bits by a position differential determined by the values of said bits in said at least one pair of bits, (5) said expanding means includes means for determining said p bits which define said next state as a non-linear function of said p bits which define said current state and bits in said current r bit group, and (6) said selecting means is arranged to form said signalling alphabets in a constellation with only 90, 180 and 270 degree symmetry such that rotation of those of said differentially encoding bits processed by said expanding means has the same effect as rotation of said signalling alphabets by 90, 180 or 270 degrees.

13. Apparatus for modulating in-phase and quadrature phase carriers in accordance with a sequence of binary digits, by associating each group of r binary digits with a signalling alphabet in a constellation, the coordinates of each alphabet determining the amplitudes of said in-phase and quadrature phase modulations, respectively, including (a) means for rotating at least some of the binary digits in each of the r bit groups of binary digits output from a differential encoder in accordance with the values of the corresponding bits in each current r bit group, (b) means for expanding each differentially encoded r bit group into an associated group of r+1 bits by a non-linear convolutional code utilizing m states, the current state of said convolutional code being determined by p bits in previous differentially encoded r bit groups, where p is an integer such that $2^p = m$, and (c) means for selecting for each of said expanded r+1 bit groups a particular signalling alphabet in said constellation, said selection being from a set of $2^r$ alphabets which correspond to all permitted transitions from said current state of said convolutional code to m possible next states of said convolutional code, alphabets in said $2^r$ set having a larger minimum distance from each other than alphabets in the complete set of $2^{r+1}$ alphabets, wherein said constellation is chosen such that the same constellation is obtained when the original constellation is rotated by 90, 180 or 270 degrees, and a different constellation is obtained for other amounts of rotation, and wherein the mapping between said signalling alphabets and said groups of r+1 bits is arranged such that rotation of the sequence of mapped signalling alphabets by 90, 180 or 270 degrees has the same effect on said modulated carriers as is obtained by rotating consistently at least some of said differentially encoded bits in each r bit group before said expansion.

14. Apparatus for modulating in-phase and quadrature phase carriers to assume a sequence of discrete values $u_n$ and $v_n$, respectively, in accordance with an applied sequence of bits, including:

(1) means for expanding each current group of r bits in said applied sequence into a group of r+1 bits in accordance with the state of an m-state convolutional code, (2) means for selecting said discrete values in accordance with the coordinates of the one of $2^{r+1}$ signalling alphabets associated with the values of the bits in each expanded r+1 bit group, said selecting means being arranged so that $2^r$ signalling alphabets correspond to all permitted transitions from each current one of said m states to m possible next states, and so that the minimum distance between said $2^r$ signalling alphabets is larger than the minimum distance between the complete set of $2^{r+1}$ signalling alphabets, and (3) means for modulating said in-phase and quadrature-phase carriers in accordance with said selected discrete values, characterized in that (4) said apparatus further includes means for differentially encoding at least one pair of bits in each group of r bits applied to said expanding means by rotating the values of a pair of previous differentially encoded bits by a position differential determined by the values of said bits in said at least one pair of bits, (5) said expanding means is arranged to determine bits in said r+1 bit group as a non-linear function of bits in said current and previous r bit groups, and (6) said selecting means is arranged to form said signalling alphabets in a constellation with only 90, 180 and 270 degree symmetry such that rotation of said differentially encoded bits processed in said expanding step has the same effect as rotation of said signalling alphabets by 90, 180 or 270 degrees.

15. A method for transmitting a bit sequence by modulating a carrier signal to sequentially assume one of a plurality of pairs of discrete signal values, comprising the steps of:

(a) expanding each current bit group into a group of r+1 bits by a finite state non-linear convolutional coding process utilizing p stored bits, the current values of said p stored bits affecting the current output of said convolutional encoder and being determined by both the previous r bit group input to said convolutional encoder and previous values of said p stored bits, (b) selecting one of $2^{r+1}$ signalling alphabets from a signal constellation, each alphabet corresponding to a pair of discrete signal values, said selection being made as a function of the r+1 bit group so that $2^r$ signalling alphabets correspond to all permitted transitions from each current internal state of said convolutional coding process to all possible next states of said convolutional coding process, and so that the $2^r$ signalling alphabets have a larger minimum distance from each other than the minimum distance within the complete set of $2^{r+1}$ signalling alphabets, and (c) transmitting the pairs of discrete signal values corresponding to the selected signalling alphabets in sequence, wherein said signal constellation is arranged so that the same signal constellation is obtained when the original constellation is rotated by 90, 180 or 270 degrees, and wherein rotation of said constellation by 90, 180 or 270 degrees produces the same effect on said transmitted discrete signal values as modification of only said current values of said p stored bits without modification of said values of said current r bit group.

16. A method for transmitting a bit sequence by modulating a carrier signal to sequentially assume one of a plurality of pairs of discrete signal values, comprising the steps of:

(a) expanding each current bit group into a group of r+1 bits by finite state non-linear convolutional coding process utilizing p stored bits, the current values of said p stored bits affecting the current output of said convolutional encoder and being determined by both the previous r bit group input to said convolutional encoder and previous values of said p stored bits, (b) selecting one of $2^{r+1}$ signalling alphabets from a signal constellation, each alphabet corresponding to a pair of discrete signal values, said selection being made as a function of the r+1 bit group so that $2^r$ signalling alphabets correspond to all permitted transitions from each current internal state of said convolutional coding process to all possible next states of said convolutional coding process, and so that the $2^r$ signalling alphabets have a larger minimum distance from each other than the minimum distance within the complete set of $2^{r+1}$ signalling alphabets, and (c) transmitting the pairs of discrete signal values corresponding to the selected signalling alphabets in sequence, wherein said signal constellation is arranged so that the same signal constellation is obtained when the original constellation is rotated by 90, 180 or 270 degrees, and wherein in said expanding step there are, for each encoder input bit sequence and each set of initial values of said p stored bits, 3 other sets of initial values of said p stored bits such that the 4 corresponding sequences of pairs of discrete signal values are related to each other by rotation of said signal constellation by 90, 180 or 270 degrees.

17. A method for encoding a sequence of bits for transmission to a receiver via a modulated carrier including the steps of:

(a) representing each group of r bits in said bit sequence by an associated r+1 bit group in accordance with the values of said r bits and the current internal state of and m-state non-linear convolutional encoder, where said states are designated by an index i=1,2, ... m, (b) mapping each r+1 bit group to an associated signalling alphabet in a constellation having 90, 180 or 270 degree symmetry, and (c) modulating in phase and quadrature phase components of said carrier in accordance with the coordinates of said associated signalling alphabet, wherein said convolutional encoder is arranged to allow transitions from each of said current states to only selected next states, each of said allowed transitions having an associated set of signalling alphabets, such that (1) three one-to-one functions $f_1$, $f_2$, and $f_3$, map each encoder state to another encoder state, and (2) for each pair of current encoder state i and next encoder state j, the three sets of signalling alphabets associated with transitions from current encoder state f (i) to next encoder state f (j)=1,2,3 can be obtained from the set of signalling alphabets associated with the transition from current encoder state i to next state j by rotating the last mentioned set of signalling alphabets by 90, 180 or 270 degrees, respectively, whereby the values of said bits in said r bit group are recoverable at said receiver despite rotations of the signalling constellation by 90, 180 or 270 degrees.

18. Apparatus for transmitting a bit sequence by modulating a carrier signal to sequentially assume one of a plurality of pairs of discrete signal values, comprising:

means for expanding each current bit group into a group of r+1 bits by a finite state non-linear convolutional coding process utilizing p stored bits, the current values of said p stored bits affecting the current output of said convolutional encoder and being determined by both the previous r bit group input to said convolutional encoder and previous values of said p stored bits, (b) means for selecting one of $2^{r+1}$ signalling alphabets from a signal constellation, each alphabet corresponding to a pair of discrete signal values, said selection being made as a function of the r+1 bit group so that $2^r$ signalling alphabets correspond to all permitted transitions from each current internal state of said convolutional coding process to all possible next states of said convolutional coding process, and so that the $2^r$ signalling alphabets have a larger minimum distance from each other than the minimum distance within the complete set of $2^{r+1}$ signalling alphabets, and means for transmitting the pairs of discrete signal values corresponding to the selected signalling alphabets in sequence, wherein said signal constellation is arranged so that the same signal constellation is obtained when the original constellation is rotated by 90, 180 or 270 degrees, and wherein rotation of said constellation by 90, 180 or 270 degrees produces the same effect on said transmitted discrete signal values as modification of only said current values of said p stored bits without modification of said values of said current r bit group.

* * * * *